(12) United States Patent
Görlitz et al.

(10) Patent No.: US 8,466,189 B2
(45) Date of Patent: Jun. 18, 2013

(54) N-ALKOXYLATED 2,3-ANTHRAQUINONEDICARBOXIMIDES FOR POLYMER COLORATION, PREPARATION AND USE

(75) Inventors: Gunter Görlitz, Bad Soden (DE); Carsten Harfmann, Frankfurt (DE); Roxana Barbieru, Singapore (SG)

(73) Assignee: Clariant (Produkte) Deutschland GmbH (DE)

( * ) Notice: Subject to any disclaimer, the term of this patent is extended or adjusted under 35 U.S.C. 154(b) by 0 days.

(21) Appl. No.: 13/060,023

(22) PCT Filed: Aug. 20, 2009

(86) PCT No.: PCT/EP2009/060758
§ 371 (c)(1),
(2), (4) Date: May 9, 2011

(87) PCT Pub. No.: WO2010/023151
PCT Pub. Date: Mar. 4, 2010

(65) Prior Publication Data
US 2011/0218276 A1   Sep. 8, 2011

(30) Foreign Application Priority Data

Aug. 27, 2008   (DE) .......................... 10 2008 039 951

(51) Int. Cl.
*A61K 31/40*      (2006.01)
*C07D 209/56*    (2006.01)

(52) U.S. Cl.
USPC .......................................... 514/410; 548/426

(58) Field of Classification Search
USPC ............................. 548/426; 524/89; 514/410
See application file for complete search history.

(56) References Cited

U.S. PATENT DOCUMENTS

| | | | |
|---|---|---|---|
| 3,994,835 A | 11/1976 | Wolf et al. | |
| 4,222,947 A | 9/1980 | Hederich et al. | |
| 4,705,567 A | 11/1987 | Hair et al. | |
| 4,777,266 A * | 10/1988 | Haspra et al. | 548/426 |
| 6,605,126 B1 | 8/2003 | Xia et al. | |
| 2004/0254335 A1 | 12/2004 | Xia | |

FOREIGN PATENT DOCUMENTS

| | | |
|---|---|---|
| DE | 2259435 | 6/1974 |
| DE | 2357933 | 5/1975 |
| DE | 2806733 | 8/1979 |
| EP | 0210135 | 1/1987 |
| GB | 1472905 | 5/1977 |
| JP | 55066956 | 5/1980 |
| JP | 61221264 | 10/1986 |
| WO | WO-99/24659 | 5/1999 |
| WO | WO-2005/000913 | 1/2005 |

OTHER PUBLICATIONS

Handa et al. CAS: 125:250297, 1996.*
Hatano et al. CAS: 148:539038, 2008.*
Matsumoto et al., "Anthraquinone-Based Dichroic Dyes of Achromatic Black Guest-host Liquid Crystal Display", Mol. Cryst. Liq. Cryst., vol. 122, pp. 285-295, 1985.

* cited by examiner

*Primary Examiner* — Rei-tsang Shiao
(74) *Attorney, Agent, or Firm* — Novak Druce Connolly Bove + Quigg LLP

(57) ABSTRACT

The present invention relates to a compound of formula (I)

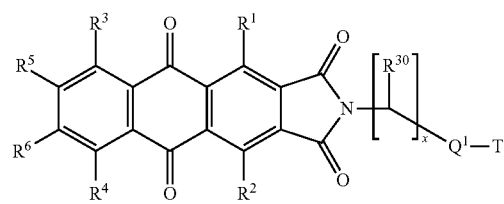

(I)

where
T, $Q^1$, $R^1$ to $R^6$ and $R^{30}$ are each as defined in claim 1, to their preparation and to their use.

12 Claims, No Drawings

N-ALKOXYLATED 2,3-ANTHRAQUINONEDICARBOXIMIDES FOR POLYMER COLORATION, PREPARATION AND USE

CROSS-REFERENCE TO RELATED APPLICATIONS

This application is a national stage application (under 35 U.S.C. §371) of PCT/EP2009/060758, filed Aug. 20, 2009, which claims benefit of German application 10 2008 039 951.5, filed Aug. 27, 2008.

BACKGROUND OF THE INVENTION

Polymers can be colored with dyes in various ways. One way is mass coloration of polymers whereby for example a pigment or a dye is mixed with the polymer and the polymer is melted to transport the dye into the polymer matrix. Other processes involve the polymer being colored or, to be more precise, dyed by the dyes defusing into the polymer from a solution or dispersion, examples being the dyeing of polymeric fibers composed of polyether, polyacrylonitrile, polyurethane, cellulose or polyamide for example with, for example, disperse dyes, cationic dyes, acid dyes, metallized dyes or reactive dyes. The use of reactive dyes results in a covalent bond being formed between the dye and the substrate, conferring particularly high fastnesses of the dyeings/colorations. Another way to color a polymer is to add the dye to the polymer's monomers or oligomers, before the polymer is formed or as it is being formed. Dyes capable of forming covalent bonds with the polymer scaffold may result likewise in colorations of high fastness being obtained. For this, the dyes used or, to be more precise, their chromophores have to be sufficiently stable under the conditions of the polymerization. Examples are reactive dyes for polyurethane which are known and are described in DE2259435 and DE2357933 for example. The solubility or dispersibility of the dye used can be significantly influenced through the choice of suitable substituents and be improved by means of suitable side chains such that the use of solvent or dispersant matrix can be greatly reduced or even omitted entirely. Examples thereof are to be found in the documents WO05/000913 and US2004254335.

Commercially available dyes for polymers are usually disperse dyes or solvent dyes and produce, when used for the coloration of polyolefins, colored polyolefins in which the dye often has only low bleed fastnesses. In addition, many of the known dyes have poor lightfastnesses or low thermal stabilities in polyolefins. Dyes having not only good bleed fastnesses but also good lightfastnesses and high thermal stabilities in polyolefins without adversely affecting the properties of the polyolefins used are not known. The dyes known from WO99/24659 do meet the requirements in part, yet it is impossible to achieve dyeings/colorations of high lightfastness with the dyes mentioned.

There is therefore a need for dyes which have the recited properties and thus are useful for the coloration of polyolefins.

BRIEF SUMMARY OF THE INVENTION

It has now been found that dyes which contain polyether chains as a substituent on cyclic imides constitute useful dyes for the coloration of polyolefins and other substrates. They have high stability under application conditions, are readily soluble in the polymer or miscible with suitable organic solvents, and afford colorations having high fastnesses.

The present invention accordingly provides compounds of formula (I)

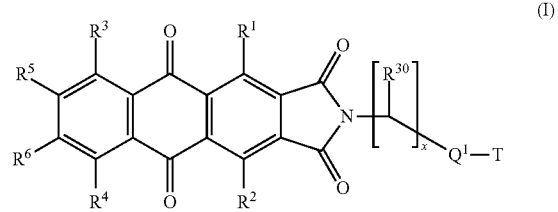

where

T represents hydrogen, hydroxyl, amino, mono-$(C_1$-$C_{15})$-alkylamino, bis-$(C_1$-$C_{15})$-alkylamino, $(C_1$-$C_{15})$-alkyl, aryl, aryloxy, $(C_1$-$C_{15})$-alkoxy, monohydroxy-$(C_1$-$C_{15})$-alkyl, polyhydroxy-$(C_1$-$C_{15})$-alkyl or $(C_1$-$C_{15})$-alkyl-aryloxy, or represents a group of formula (1)

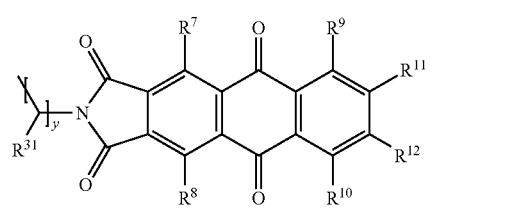

or represents a group of formula (2)

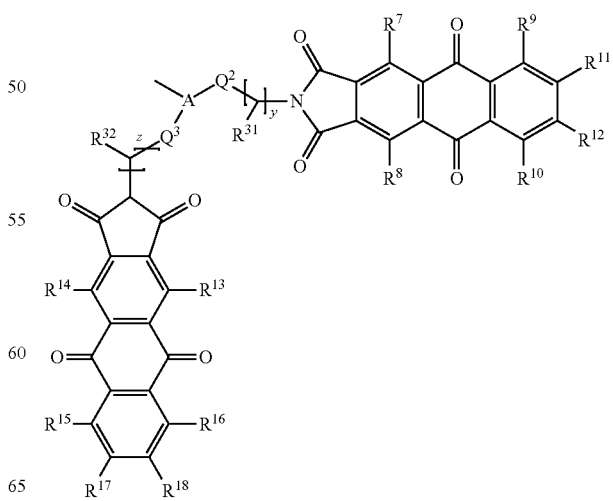

or represents a group of formula (3)

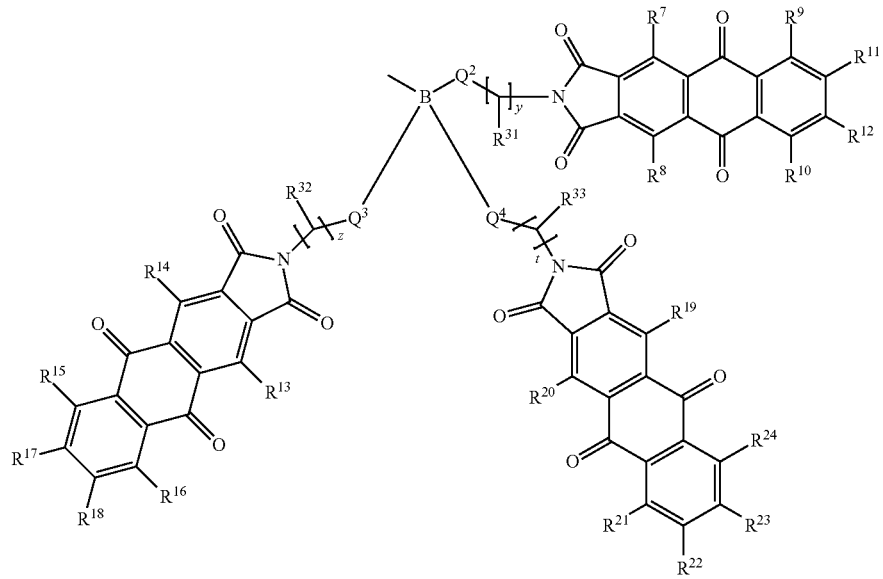

$Q^1$ to $Q^4$ each represents a group of formula (4)

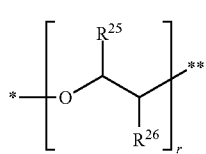

where r represents a rational number from 0.1 to 200 and has identical or different meanings within any one molecule of formula (I);

$R^{25}$ and $R^{26}$ each dependently represent hydrogen, $(C_1-C_{15})$-alkyl, singly or multiply oxygen-interrupted $(C_1-C_{15})$-alkyl, aryl, aryloxy, $(C_1-C_{15})$-alkoxy, monohydroxy-$(C_1-C_{15})$-alkyl or polyhydroxy-$(C_1-C_{15})$alkyl;

and where $R^{25}$ and $R^{26}$ have identical or different meanings within any one molecule of formula (I); and where when $R^{25}$ and $R^{26}$ have different meanings within any one molecule of formula (I) these different meanings are randomly distributed or regions of respectively identical meanings follow each other; and wherein the groups T, A and B are bonded to the bond * or to the bond **;

$R^1$ to $R^{24}$ each independently represent hydrogen; $(C_1-C_{15})$-alkyl; trifluoromethyl; cyclo-$(C_3-C_8)$-alkyl; aryl; heteroaryl; heterocycloalkyl; halogen; cyano; nitro; hydroxyl; $(C_1-C_{15})$-alkoxy; aryloxy; $(C_2-C_{15})$-acyl; arylcarbonyl; $(C_2-C_{15})$-acyloxy;

arylcarbonyloxy; $(C_2-C_{15})$-acylamino; $(C_1-C_{15})$-alkylsulfonylamino; arylsulfonylamino; arylcarbonylamino; carbamoyl; N-monocyclo-$(C_3-C_8)$-alkyl-carbamoyl; N-mono-$(C_1-C_{15})$-alkyl-carbamoyl; N,N-dicyclo-$(C_3-C_8)$-alkyl-carbamoyl; N,N-di-$(C_1-C_{15})$-alkyl-carbamoyl; N-monoaryl-carbamoyl; N,N-diaryl-carbamoyl; N-monocyclo-$(C_3-C_8)$-alkyl-N-monoarylcarbamoyl;

N-mono-$(C_1-C_{15})$-alkyl-N-monoarylcarbamoyl; $(C_1-C_{15})$-alkoxycarbonyl; aryloxy-carbonyl; amino; monocyclo-$(C_3-C_8)$-alkyl-amino; mono-$(C_1-C_{15})$-alkyl-amino; di(cyclo)-$(C_3-C_8)$-alkyl-amino; di-$(C_1-C_{15})$-alkyl-amino; monoaryl-amino; diaryl-amino; monocyclo-$(C_3-C_8)$-alkylmonoarylamino; mono-$(C_1-C_{15})$-alkylmonoaryl-amino; aminothiocarbonylamino; aminocarbonylamino; sulfamoyl; N-monocyclo-$(C_3-C_8)$-alkyl-sulfamoyl; N-mono-$(C_1-C_{15})$-alkyl-sulfamoyl; N,N-dicyclo-$(C_3-C_8)$-alkyl-sulfamoyl; N,N-di-$(C_1-C_{15})$-alkyl-sulfamoyl; N-monoaryl-sulfamoyl; N,N-diaryl-sulfamoyl; N-monocyclo-$(C_3-C_3)$-alkyl-N-monoarylsulfamoyl; N-mono-$(C_1-C_{15})$-alkyl-N-monoarylsulfamoyl; aminosulfonylamino; $(C_1-C_{15})$-alkylthio; arylthio; $(C_1-C_{15})$-alkylsulfonyl or arylsulfonyl;

or each independently represent $(C_1-C_{15})$-alkyl, N-mono-$(C_1-C_{15})$-alkylamino, N,N-di-$(C_1-C_{15})$-alkylamino, N—$(C_1-C_{15})$-alkyl-N-cyclo-$(C_3-C_8)$-alkylamino, N—$(C_1-C_{15})$-alkyl-N-arylamino, $(C_1-C_{15})$-alkoxy, $(C_1-C_{15})$-alkylthio, $(C_2-C_{15})$-acyl or $(C_1-C_{15})$-alkylsulfonyl which are each substituted by one or more substituents selected from the group consisting of hydroxyl, $(C_3-C_8)$-cycloalkyl, heteroaryl, heterocyclo-$(C_3-C_8)$-alkyl, aryl, aryloxy, $(C_1-C_{15})$-alkoxy, $(C_1-C_{15})$-alkylthio, arylthio, poly(oxy-$(C_1-C_{15})$-alkylene)$_s$, halogen, cyano, $(C_1-C_{15})$-alkoxycarbonyl, $(C_1-C_{15})$-alkoxythiocarbonyl, $(C_2-C_{15})$-acyloxy, carbamoyl, sulfamoyl, nitro, amino, $(C_2-C_{15})$-acylamino, arylcarbonylamino, $(C_1-C_{15})$-alkylsulfonylamino, arylsulfonylamino, aminocarbonylamino, aminothiocarbonylamino, N-mono-$(C_1-C_{15})$-alkylamino, N-mono-(hydroxy-$(C_1-C_{15})$-alkyl)amino, N,N-bis-(hydroxy-$(C_1-C_{15})$-alkyl)amino, N-mono-$(C_1-C_{15})$-alkoxy-$(C_1-C_{15})$-alkyl)amino, N,N-bis-$(C_1-C_{15})$-alkoxy-$(C_1-C_{15})$-alkyl)amino, N-mono-$(C_1-C_{15})$-alkoxy-$(C_1-C_{15})$-alkyl)amino, N-mono-$(C_1-C_{15})$-alkylthio-$(C_1-C_{15})$-alkyl)amino, N-bis-$(C_1-C_{15})$-alkylthio-$(C_1-C_{15})$-alkyl)amino, N-monocyclo-$(C_3-C_8)$-alkylamino, N-monoaryl-amino, N,N-di-$(C_1-C_{15})$-alkyl-amino, N,N-dicyclo-$(C_3-C_8)$-alkylamino, N,N-diaryl-amino, N—$(C_1-C_{15})$-alkyl-N-aryl-amino, N-cyclo-$(C_3-C_8)$-alkyl-N-aryl-amino or aminosulfonylamino;

or each independently represent aryl, monoaryl-amino; diaryl-amino, aryloxy, arylthio, arylcarbonyl, arylcarbonyloxy; arylsulfonylamino; arylcarbonylamino, N-monoaryl-carbamoyl; N,N-diaryl-carbamoyl, N-monocyclo-($C_3$-$C_8$)-alkyl-N-monoarylcarbamoyl; N-mono-($C_1$-$C_{15}$)-alkyl-N-monoarylcarbamoyl; monocyclo-($C_3$-$C_8$)-alkylmono-arylamino; mono-($C_1$-$C_{15}$)-alkylmonoarylamino; N-monoaryl-sulfamoyl; N,N-diarylsulfamoyl; N-monocyclo-($C_3$-$C_8$)-alkyl-N-monoarylsulfamoyl; N-mono-($C_1$-$C_{15}$)-alkyl-N-monoarylsulfamoyl or arylsulfonyl, wherein the aryl radical is substituted by one or more substituents selected from the group consisting of hydroxyl, ($C_1$-$C_{15}$)-alkyl, ($C_3$-$C_8$)-cycloalkyl, heteroaryl, heterocyclo-($C_3$-$C_8$)-alkyl, ($C_1$-$C_{15}$)-alkoxy, ($C_1$-$C_{15}$)alkylthio, poly(oxy-($C_1$-$C_{15}$)-alkylene)$_s$, halogen, cyano, ($C_1$-$C_{15}$)-alkoxycarbonyl, ($C_1$-$C_{15}$)-alkoxythiocarbonyl, ($C_2$-$C_{15}$)-acyloxy, carbamoyl, N-monocyclo-($C_3$-$C_8$)-alkylcarbamoyl, N-mono-($C_1$-$C_{15}$)-alkyl-carbamoyl, N,N-dicyclo-($C_3$-$C_8$)-alkyl-carbamoyl, N,N-di-($C_1$-$C_{15}$)-alkyl-carbamoyl, N-monoaryl-carbamoyl, N,N-diaryl-carbamoyl, N-monocyclo-($C_3$-$C_8$)-alkyl-N-monoarylcarbamoyl, N-mono-($C_1$-$C_{15}$)-alkyl-N-monoarylcarbamoyl, sulfamoyl, N-monocyclo-($C_3$-$C_8$)-alkyl-sulfamoyl, N-mono-($C_1$-$C_{15}$)-alkyl-sulfamoyl, N-mono-(hydroxy-($C_1$-$C_{15}$)-alkyl) sulfamoyl, N,N-dicyclo-($C_3$-$C_8$)alkyl-sulfamoyl, N,N-di-($C_1$-$C_{15}$)-alkyl-sulfamoyl, N-monoaryl-sulfamoyl, N,N-diaryl-sulfamoyl, N-monocyclo-($C_3$-$C_8$)-alkyl-N-monoarylsulfamoyl, N-mono-($C_1$-$C_{15}$)-alkyl-N-monoarylsulfamoyl, nitro, amino, ($C_2$-$C_{15}$)-acylamino, arylcarbonylamino, ($C_1$-$C_{15}$)-alkylsulfonylamino, arylsulfonylamino, aminocarbonylamino, aminothio-carbonylamino, N-mono-($C_1$-$C_{15}$)-alkylamino, N-mono-(hydroxy-($C_1$-$C_{15}$)-alkyl)amino, N,N-bis-(hydroxy-($C_1$-$C_{15}$)-alkyl)amino, N-mono(($C_1$-$C_{15}$)-alkoxy-($C_1$-$C_{15}$)-alkyl)amino, N,N-bis-(($C_1$-$C_{15}$)-alkoxy-($C_1$-$C_{15}$)-alkyl) amino, N-mono-(($C_1$-$C_{15}$)-alkoxy-($C_1$-$C_{15}$)-alkyl)amino, N-mono-(($C_1$-$C_{15}$)-alkylthio-($C_1$-$C_{15}$)-alkyl)amino, N-bis-(($C_1$-$C_{15}$)-alkylthio-($C_1$-$C_{15}$)-alkyl)amino, N-monocyclo-($C_3$-$C_8$)-alkylamino, N-monoaryl-amino, N,N-di-($C_1$-$C_{15}$)-alkyl-amino, N,N-dicyclo-($C_3$-$C_8$)-alkylamino, N,N-diaryl-amino, N-cyclo-($C_3$-$C_8$)-alkyl-N-aryl-amino or aminosulfonylamino;

$R^{30}$ to $R^{33}$ each independently represent hydrogen, ($C_1$-$C_{15}$)-alkyl, singly or multiply oxygen-interrupted ($C_1$-$C_{15}$)-alkyl, aryl, aryl-($C_1$-$C_{15}$)-alkyl, ($C_1$-$C_{15}$)-alkyl-aryl, aryloxy, ($C_1$-$C_{15}$)-alkoxy, monohydroxy-($C_1$-$C_{15}$)-alkyl or polyhydroxy-($C_1$-$C_{15}$)-alkyl and have identical or different meanings within any one molecule of formula (I);

x represents a number from 1 to 30;

y, z and t each independently represent a number from 0 to 30;

A represents a group of formula (5)

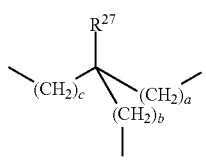

where a, b and c each independently represent a number from 0 to 15;

$R^{27}$ represents hydrogen, ($C_1$-$C_{15}$)-alkyl, singly or multiply oxygen-interrupted ($C_1$-$C_{15}$)-alkyl, aryloxy, ($C_1$-$C_{15}$)-alkoxy, monohydroxy-($C_1$-$C_{15}$)alkyl or polyhydroxy-($C_1$-$C_{15}$)-alkyl; and B represents a group of formula (6)

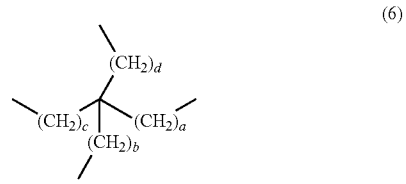

where a, b, c and d each independently represent a number from 0 to 15.

In the abovementioned definitions, alkyl groups may be straight chain or branched and are for example methyl, ethyl, n-propyl, isopropyl, n-butyl or isobutyl, but also hexyl, such as n-hexyl, heptyl, such as n-heptyl, octyl, such as n-octyl and isooctyl, nonyl, such as n-nonyl, decyl, such as n-decyl, dodecyl, such as n-dodecyl or octadecyl, such as n-octadecyl. Preference is given to ($C_1$-$C_4$)-alkyl groups. The same holds mutatis mutandis for alkoxy and alkylene groups and also for when the recited groups are substituted.

Aryl preferably stands for phenyl and naphthyl and arylene for phenylene, particularly 1,2-, 1,3- and 1,4-phenylene and naphthylene, such as, in particular, 1,4-, 1,5- and 1,8-naphthylene.

Halogen is in particular fluorine, chlorine or bromine.

Heteroaryl is preferably pyridine, pyrimidine, pyridazine, pyrazine, pyrrole, imidazole, pyrazoles, 1,2,4-thiadiazole, 1,2,4-triazole, tetrazole, thiophene, thiazole, isothiazole, 1,3,4-thiadiazole, furan, oxazole or isoxazole.

Heterocycloalkyl is preferably pyrrolidine, piperidine, morpholine or piperazine.

DETAILED DESCRIPTION OF THE INVENTION

In preferred compounds of formula (I) according to the present invention, the $R^{25}$ and $R^{26}$ substituents in the group of formula (4) have different meanings within any one molecule, wherein regions of respectively identical meanings follow each other.

Particularly preferred dyes of formula (I) according to the present invention conform to formula (Ia)

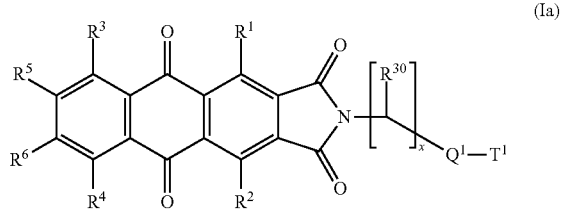

where $T^1$ represents hydrogen, hydroxyl, amino, mono-($C_1$-$C_{15}$) alkylamino, bis-($C_1$-$C_{15}$)alkylamino, ($C_1$-$C_{15}$)alkyl, aryl, aryloxy, ($C_1$-$C_{15}$)-alkoxy, monohydroxy-($C_1$-$C_{15}$)-alkyl, polyhydroxy-($C_1$-$C_{15}$)-alkyl or ($C_1$-$C_{15}$)-alkyl-aryloxy;

$R^1$ to $R^6$ each independently represent hydrogen; ($C_1$-$C_{15}$)-alkyl; trifluoromethyl; aryl; halogen; cyano; nitro; hydroxyl; ($C_1$-$C_{15}$)-alkoxy; aryloxy; arylcarbonyl; ($C_2$-$C_{15}$)-acylamino; ($C_1$-$C_{15}$)-alkylsulfonylamino; arylsulfonylamino; arylcarbonylamino; carbamoyl; amino; monocyclo-($C_3$-$C_8$)-alkyl-amino; mono-($C_1$-$C_{15}$)-alkyl-amino;

di(cyclo)-($C_3$-$C_8$)-alkyl-amino; di-($C_1$-$C_{15}$)-alkyl-amino; monoaryl-amino; diaryl-amino; monocyclo-($C_3$-$C_8$)-alkylmonoarylamino; mono-($C_1$-$C_{15}$)-alkylmonoarylamino; aminocarbonylamino; sulfamoyl; aminosulfonylamino; ($C_1$-$C_{15}$)-alkylthio; arylthio or ($C_1$-$C_{15}$)-alkylsulfonyl;

or each independently represent ($C_1$-$C_{15}$)-alkyl, N-mono-($C_1$-$C_{15}$)-alkylamino, N-monocyclo-($C_3$-$C_8$)-alkylamino, N,N-di-($C_1$-$C_{15}$)-alkylamino, N,N-dicyclo-($C_3$-$C_8$)-alkylamino, N—($C_1$-$C_{15}$)-alkyl-N-cyclo-($C_3$-$C_8$)-alkylamino, N—($C_1$-$C_{15}$)-alkyl-N-arylamino, N-aryl-N-cyclo-($C_3$-$C_8$)-alkylamino, ($C_1$-$C_{15}$)-alkoxy, ($C_1$-$C_{15}$)-alkylthio or ($C_1$-$C_{15}$)-alkylsulfonyl which are each substituted by one or more substituents selected from the group consisting of hydroxyl, ($C_3$-$C_8$)-cycloalkyl, heteroaryl, heterocycloalkyl, aryl, aryloxy, ($C_1$-$C_{15}$)-alkoxy, halogen, cyano, ($C_1$-$C_{15}$)-alkoxy-carbonyl, carbamoyl, sulfamoyl, nitro, amino, ($C_2$-$C_{15}$)-acylamino, arylcarbonylamino, ($C_1$-$C_{15}$)-alkylsulfonylamino, arylsulfonylamino, aminocarbonylamino and aminosulfonylamino;

or each independently represent aryl, monoaryl-amino; diaryl-amino, aryloxy, arylthio, arylcarbonyl, arylcarbonyloxy; arylsulfonylamino; arylcarbonylamino, mono-cyclo-($C_3$-$C_8$)-alkylmonoarylamino; mono-($C_1$-$C_{15}$)-alkylmonoaryl-amino or arylsulfonyl, wherein aryl is substituted by one or more substituents selected from the group consisting of hydroxyl, ($C_1$-$C_{15}$)-alkyl, ($C_1$-$C_{15}$)-alkoxy, ($C_1$-$C_{15}$)-alkylthio, halogen, cyano, ($C_1$-$C_{15}$)-alkoxycarbonyl, ($C_2$-$C_{15}$)-acyloxy, carbamoyl, N-mono-($C_1$-$C_{15}$)-alkyl-carbamoyl, N-mono-(hydroxy-($C_1$-$C_{15}$)-alkyl)carbamoyl, sulfamoyl, N-mono-($C_1$-$C_{15}$)-alkyl-sulfamoyl, N-mono-(hydroxy-($C_1$-$C_{15}$)-alkyl)sulfamoyl, nitro, amino, ($C_2$-$C_{15}$)-acylamino, ($C_1$-$C_{15}$)-alkylsulfonylamino, aminocarbonylamino, N-mono-($C_1$-$C_{15}$)-alkylamino, N-mono-(hydroxy-($C_1$-$C_{15}$)-alkyl)amino, N,N-bis-(hydroxy-($C_1$-$C_{15}$)-alkyl)amino, N,N-di-($C_1$-$C_{15}$)-alkyl-amino and aminosulfonylamino;

$R^{30}$ and $R^{31}$ each independently represent hydrogen or ($C_1$-$C_{15}$)-alkyl; singly or multiply oxygen-interrupted ($C_1$-$C_{15}$) alkyl, aryl, aryl-($C_1$-$C_{15}$)-alkyl, ($C_1$-$C_{15}$)-alkyl-aryl, aryloxy, ($C_1$-$C_{15}$)-alkoxy, monohydroxy-($C_1$-$C_{15}$)-alkyl or polyhydroxy-($C_1$-$C_{15}$)-alkyl;

x represents a number from 1 to 10; and $Q^1$ is as defined above.

In particularly preferred compounds of formula (Ia)

$T^1$ represents ($C_1$-$C_{15}$)-alkoxy, ($C_1$-$C_{15}$)-alkyl or ($C_1$-$C_{15}$)-alkyl-aryloxy;

$R^1$ and $R^2$ each independently represent amino, hydroxyl, mono-($C_1$-$C_{15}$)-alkyl-amino or monoaryl-amino, wherein aryl is substituted by ($C_1$-$C_{15}$)-alkyl, sulfamoyl, carbamoyl, N-mono-(hydroxy-($C_1$-$C_{15}$)-alkyl)sulfamoyl or N-mono-(hydroxy-($C_1$-$C_{15}$)-alkyl)carbamoyl;

$R^3$, $R^4$, $R^5$ and $R^6$ each independently represent hydrogen, amino, hydroxyl, nitro, mono-($C_1$-$C_{15}$)-alkyl-amino and monoaryl-amino, wherein aryl is substituted by ($C_1$-$C_{15}$)-alkyl;

$R^{30}$ and $R^{31}$ each independently represent hydrogen or ($C_1$-$C_{15}$)alkyl; and x represents 1, 2 or 3;

and $Q^1$ represents a group of formula (4) wherein r represents a rational number from 0.1 to 100 and has identical or different meanings within any one molecule of formula (Ia); and $R^{25}$ to $R^{26}$ each independently represent hydrogen or ($C_1$-$C_{15}$)-alkyl and wherein $R^{25}$ and $R^{26}$ have identical or different meanings within any one molecule of formula (Ia); and wherein when $R^{25}$ and $R^{26}$ have different meanings within any one molecule of formula (Ia), these different meanings are randomly distributed or regions of respectively identical meanings follow each other.

Examples of compounds of formula (Ia) are the compounds of formulae (Iaa) to (Iay)

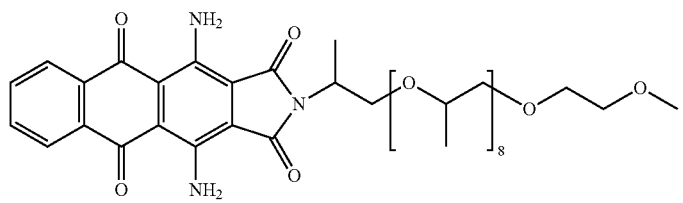

(Iaa)

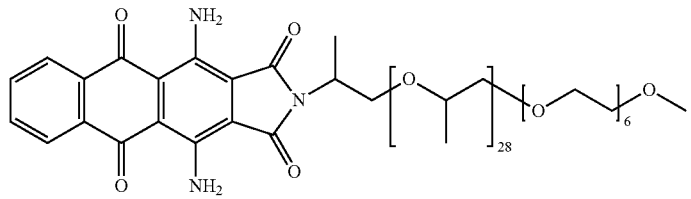

(Iab)

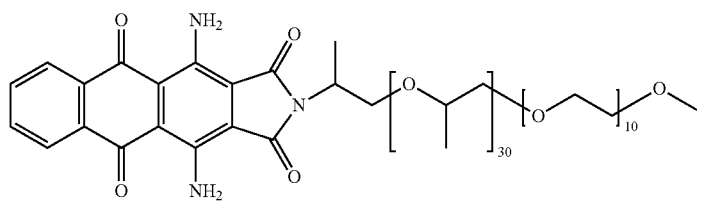

(Iac)

-continued
(Iad)
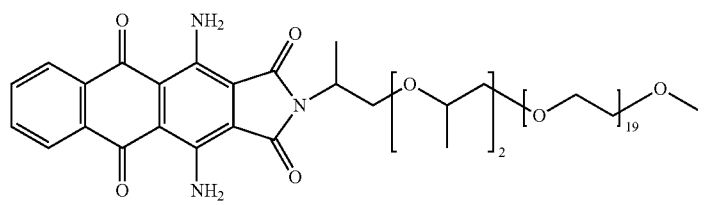
(Iae)
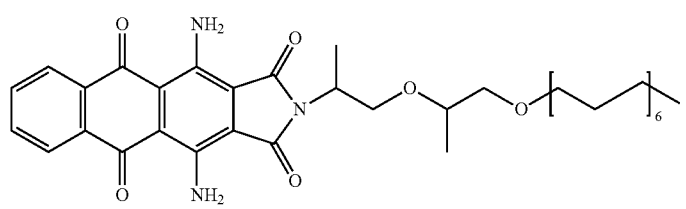
(Iaf)
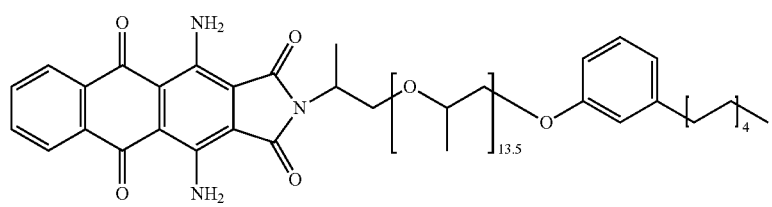
(Iag)
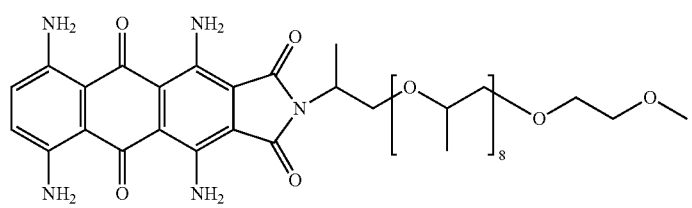
(Iah)
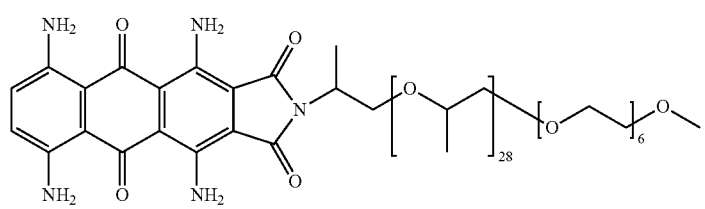
(Iai)
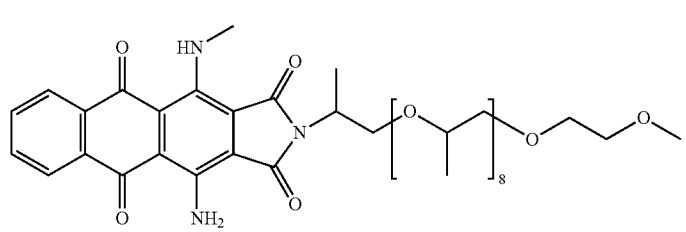
(Iaj)
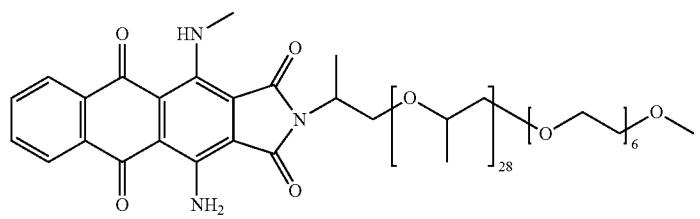

(Iak)
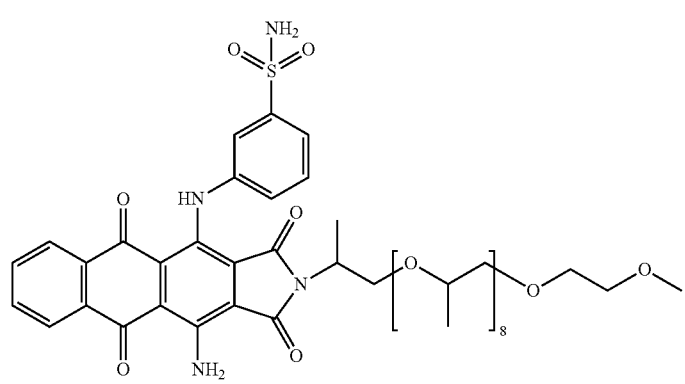
(Ial)
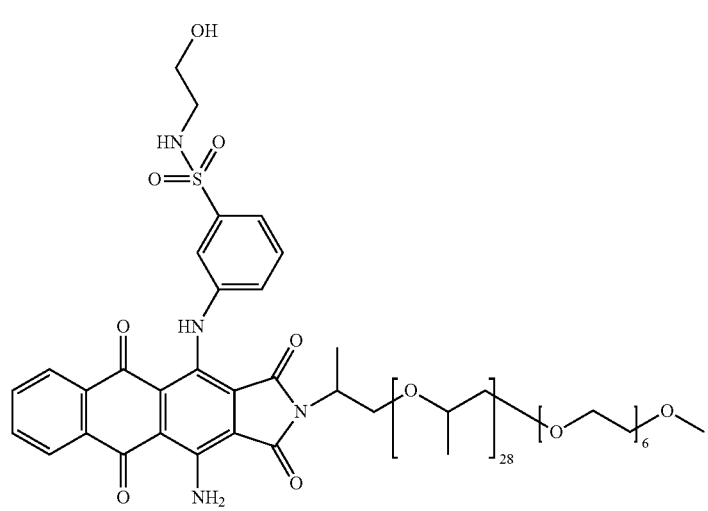
(Iam)
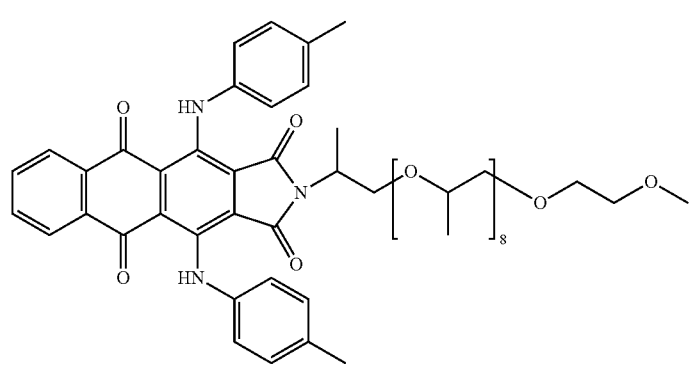
(Ian)
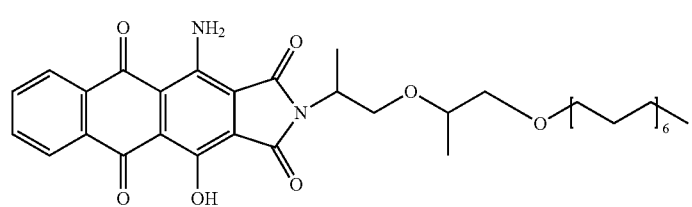

(Iao)
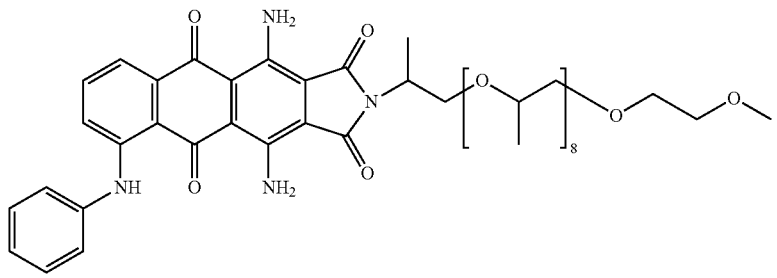
(Iap)
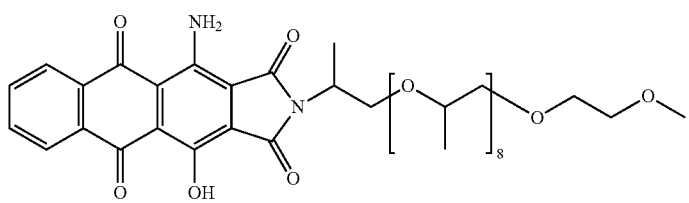
(Iar)
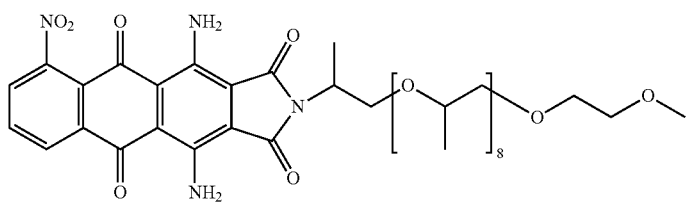
(Ias)
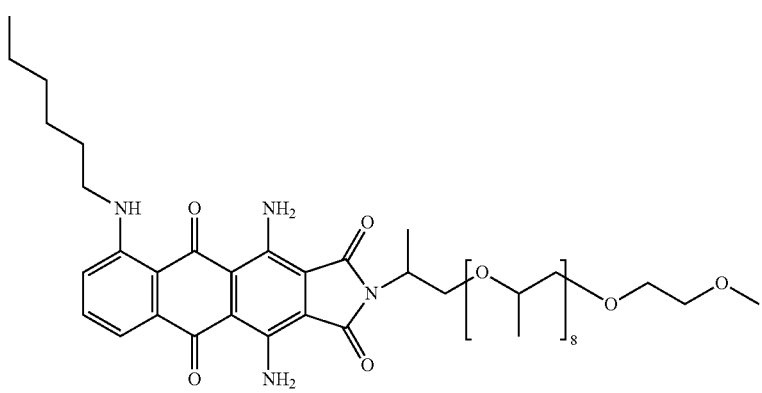
(Iat)
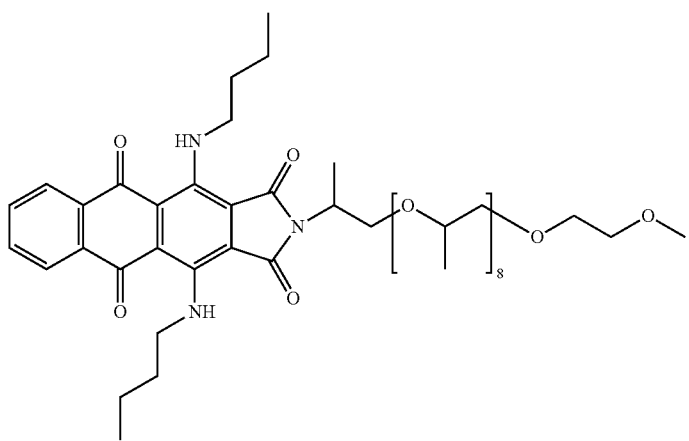

-continued
(Iau)
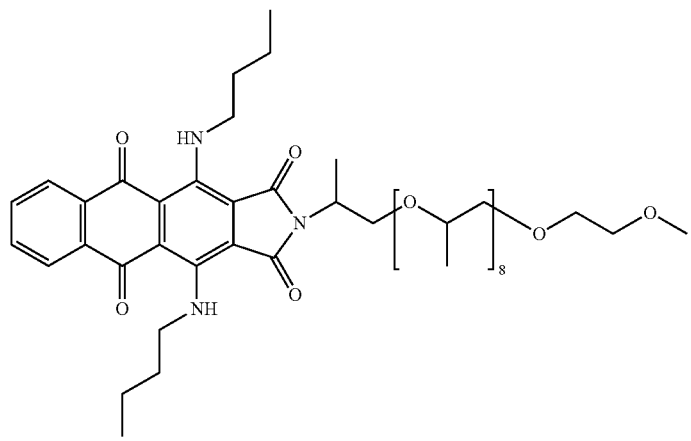
(Iav)
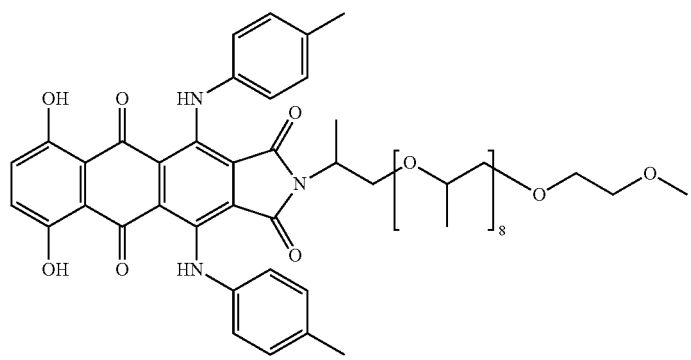
(Iaw)
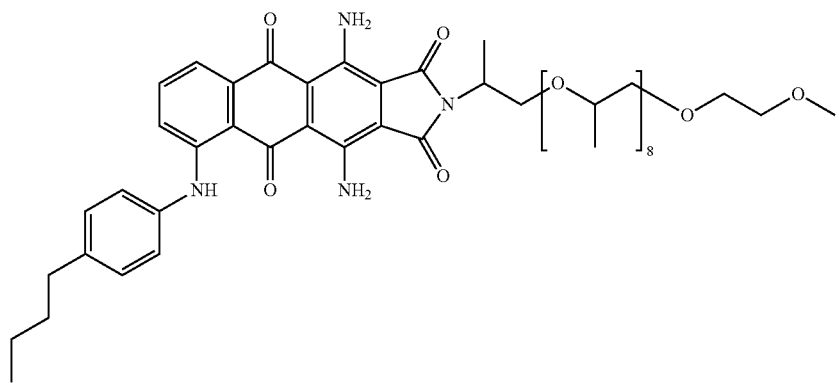
(Iax)
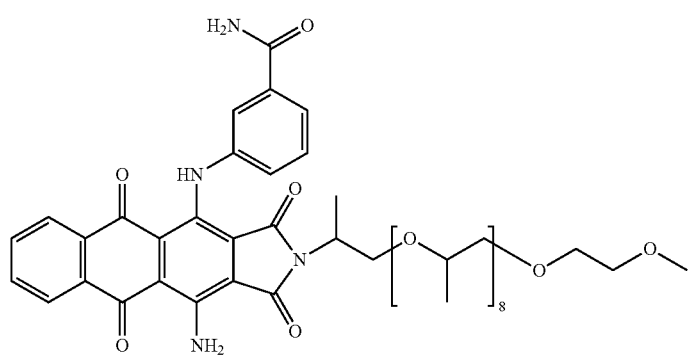

-continued

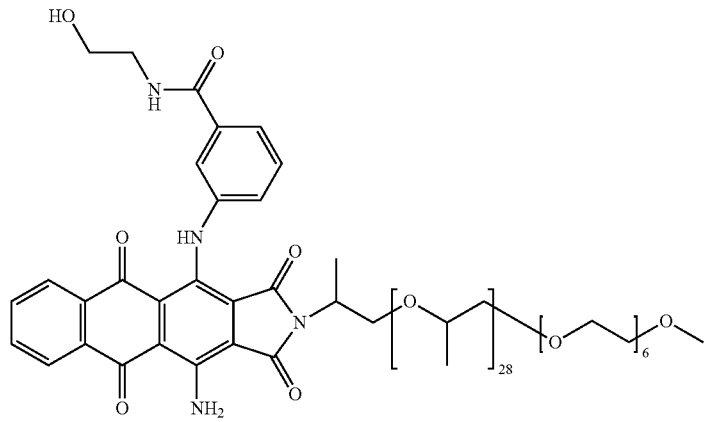

(Iay)

Further particularly preferred dyes of formula (I) according to the present invention conform to formula (Ib)

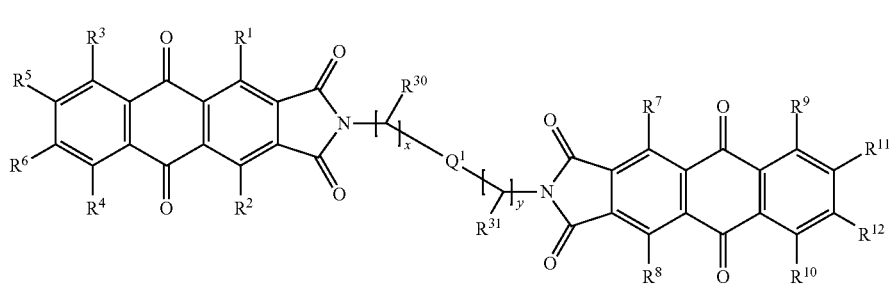

(Ib)

where
$R^1$ to $R^{12}$ each dependently represent hydrogen; $(C_1-C_{15})$-alkyl; trifluoromethyl; aryl; halogen; cyano; nitro; hydroxyl; $(C_1-C_5)$-alkoxy; aryloxy; arylcarbonyl, $(C_2-C_{15})$-acyl-amino; $(C_1-C_{15})$-alkylsulfonylamino; arylsulfonylamino; arylcarbonylamino; carbamoyl; amino; mono-cyclo-$(C_3-C_8)$-alkyl-amino; mono-$(C_1-C_{15})$-alkyl-amino; di(cyclo)-$(C_3-C_8)$-alkyl-amino; di-$(C_1-C_{15})$-alkyl-amino; monoaryl-amino; diaryl-amino; monocyclo-$(C_3-C_8)$-alkylmonoarylamino; mono-$(C_1-C_{15})$-alkylmonoarylamino; aminocarbonylamino; sulfamoyl; aminosulfonylamino; $(C_1-C_{15})$-alkylthio; arylthio or $(C_1-C_{15})$-alkylsulfonyl; or each independently represent $(C_1-C_{15})$-alkyl, N-mono-$(C_1-C_{15})$-alkylamino, N-monocyclo-$(C_3-C_8)$-alkylamino, N,N-di-$(C_1-C_{15})$-alkylamino, N,N-dicyclo-$(C_3-C_8)$-alkylamino, N—$(C_1-C_{15})$-alkyl-N-cyclo-$(C_3-C_8)$-alkylamino, N—$(C_1-C_{15})$-alkyl-N-arylamino, N-aryl-N-cyclo-$(C_3-C_8)$-alkylamino, $(C_1-C_{15})$-alkoxy, $(C_1-C_{15})$-alkylthio or $(C_1-C_{15})$-alkylsulfonyl which are each substituted by one or more substituents selected from the group consisting of hydroxyl, heteroaryl, heterocycloalkyl, aryl, aryloxy, $(C_1-C_{15})$-alkoxy, halogen, cyano, $(C_1-C_{15})$-alkoxycarbonyl, carbamoyl, sulfamoyl, nitro, amino, $(C_2-C_{15})$-acylamino, arylcarbonylamino, $(C_1-C_{15})$-alkylsulfonylamino, arylsulfonylamino, aminocarbonylamino and aminosulfonylamino; or each independently represent aryl, monoaryl-amino; diaryl-amino, aryloxy, arylthio, arylcarbonyl, arylcarbonyloxy; arylsulfonylamino; arylcarbonylamino, mono-cyclo-$(C_3-C_8)$-alkylmonoarylamino; mono-$(C_1-C_{15})$-alkylmonoaryl-amino or arylsulfonyl, wherein aryl is substituted by one or more substituents selected from the group consisting of hydroxyl, $(C_1-C_{15})$-alkyl, $(C_1-C_{15})$-alkoxy, $(C_1-C_{15})$-alkylthio, halogen, cyano, $(C_1-C_{15})$-alkoxycarbonyl, $(C_2-C_{15})$-acyloxy, carbamoyl, N-mono-$(C_1-C_{15})$-alkyl-carbamoyl, N-mono-(hydroxy-$(C_1-C_{15})$-alkyl)carbamoyl, sulfamoyl, N-mono-$(C_1-C_{15})$-alkyl-sulfamoyl, N-mono-(hydroxy-$(C_1-C_{15})$-alkyl)sulfamoyl, nitro, amino, $(C_2-C_{15})$-acylamino, $(C_1-C_{15})$-alkylsulfonylamino, aminocarbonylamino, N-mono-$(C_1-C_{15})$-alkylamino, N-mono-(hydroxy-$(C_1-C_{15})$-alkyl)amino, N,N-bis-(hydroxy-$(C_1-C_{15})$-alkyl)amino, N,N-di-$(C_1-C_{15})$-alkyl-amino and aminosulfonylamino;

$R^{30}$ and $R^{31}$ each independently represent hydrogen, $(C_1-C_{15})$-alkyl; singly or multiply oxygen-interrupted $(C_1-C_{15})$ alkyl, aryl, aryl-$(C_1-C_{15})$-alkyl, $(C_1-C_{15})$-alkyl-aryl, aryloxy, $(C_1-C_{15})$-alkoxy, monohydroxy-$(C_1-C_{15})$-alkyl or polyhydroxy-$(C_1-C_{15})$-alkyl;

x represents a number from 1 to 10; and
y represents a number from 0 to 10; and
$Q^1$ is as defined above.

In particularly preferred compounds of formula (Ib)
$R^1$, $R^2$, $R^7$ and $R^8$ each independently represent amino, hydroxyl, mono-$(C_1-C_{15})$-alkyl-amino or monoaryl-amino, wherein aryl is substituted by $(C_1-C_{15})$-alkyl, sulfamoyl, carbamoyl, N-mono-(hydroxy-$(C_1-C_{15})$-alkyl) sulfamoyl or N-mono-(hydroxy-$(C_1-C_{15})$-alkyl) carbamoyl;

$R^3$, $R^4$, $R^5$, $R^6$, $R^9$, $R^{10}$, $R^{11}$ and $R^{12}$ each independently represent hydrogen, amino, hydroxyl, nitro, mono-$(C_1$-$C_{15})$-alkyl-amino or monoaryl-amino, wherein aryl is substituted by $(C_1$-$C_{15})$-alkyl;

$R^{30}$ and $R^{31}$ each independently represent hydrogen or $(C_1$-$C_{15})$alkyl;

x represents 1, 2 or 3; and y represents 0 or 1; and $Q^1$ represent a group of formula (4) wherein r represents a rational number from 0.1 to 100 and has identical or different meanings within any one molecule of formula (Ib); and $R^{25}$ to $R^{26}$ each independently represent hydrogen or $(C_1$-$C_{15})$-alkyl and wherein $R^{25}$ and $R^{26}$ have identical or different meanings within any one molecule of formula (Ib); and wherein when $R^{25}$ and $R^{26}$ have different meanings within any one molecule of formula (Ib), these different meanings are randomly distributed or regions of respectively identical meanings follow each other.

Examples of compounds of formula (Ib) are the compounds of formulae (Iba) to (Ibu)

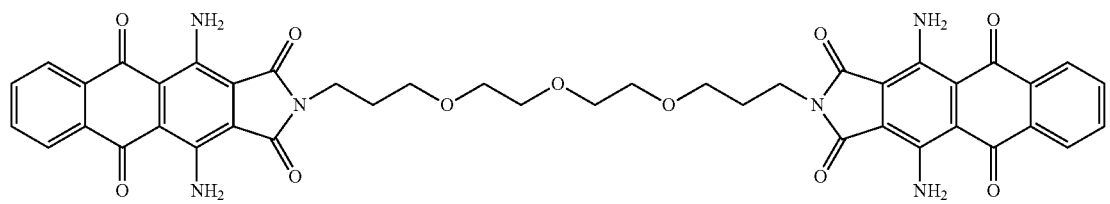
(Iba)

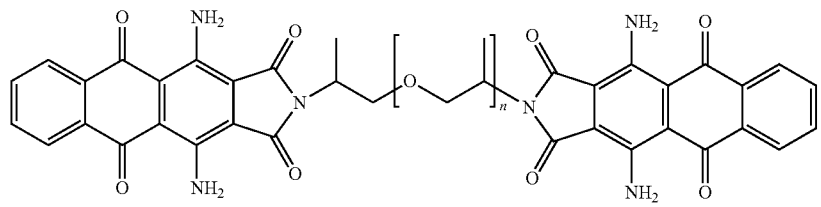
(Ibb)

n = about 2.5

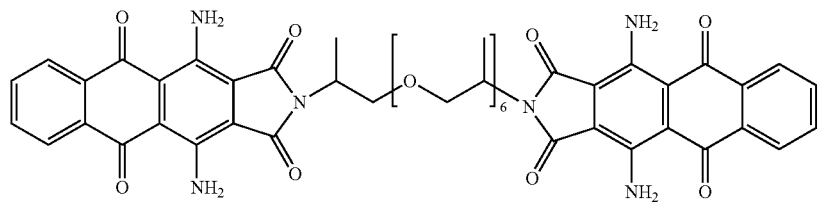
(Ibc)

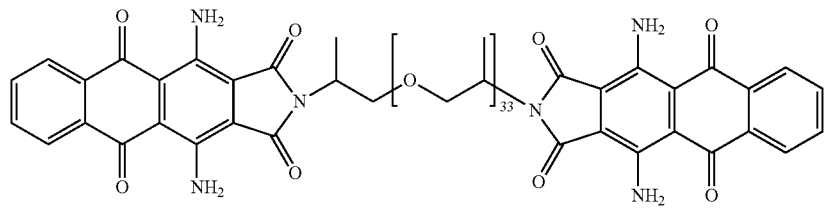
(Ibd)

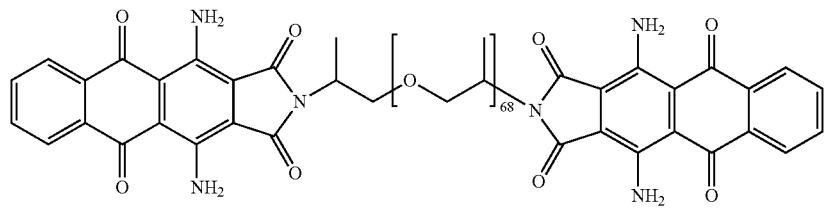
(Ibe)

-continued
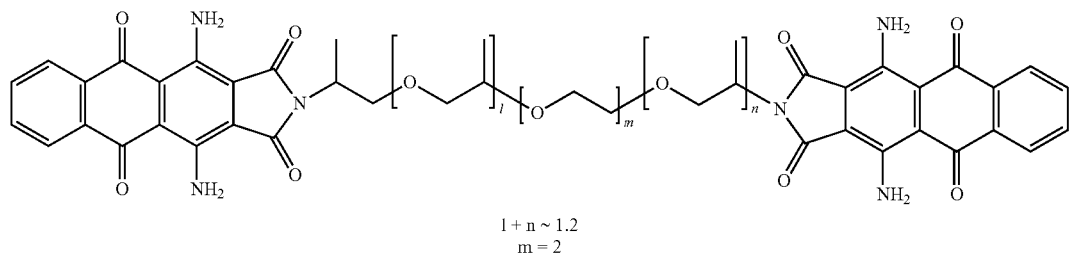
(Ibf)
l + n ~ 1.2
m = 2
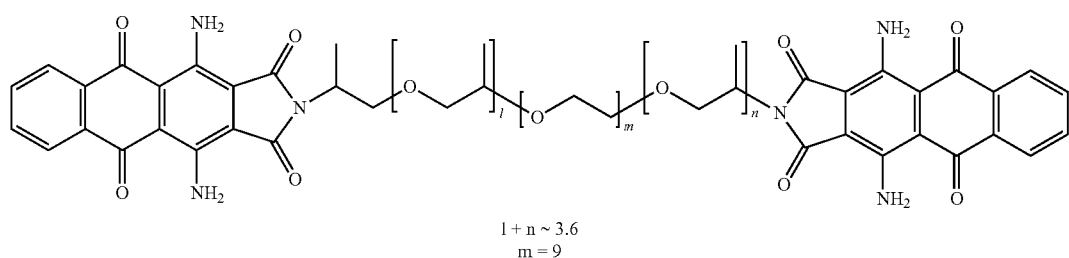
(Ibg)
l + n ~ 3.6
m = 9
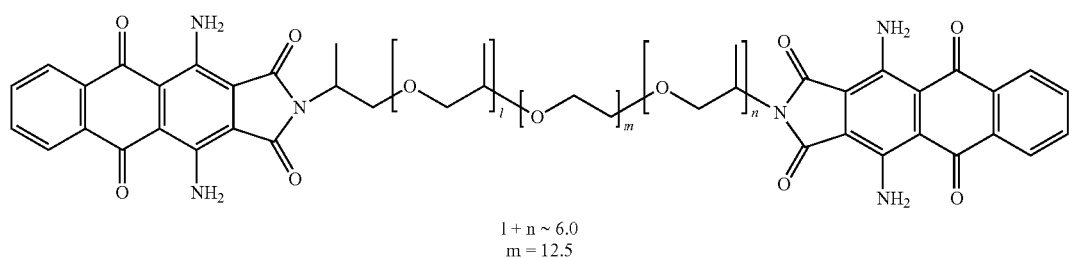
(Ibh)
l + n ~ 6.0
m = 12.5
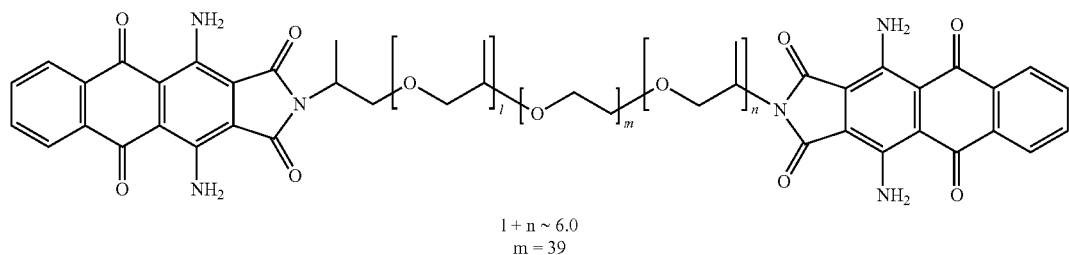
(Ibi)
l + n ~ 6.0
m = 39
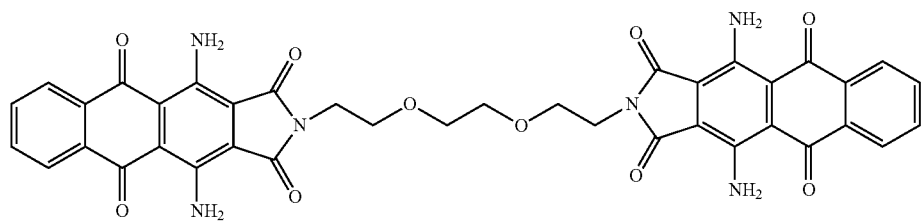
(Ibj)
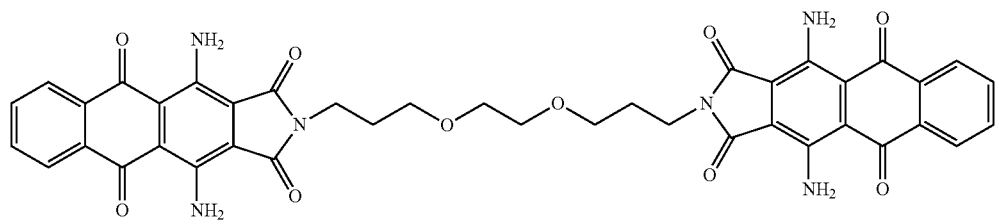
(Ibk)

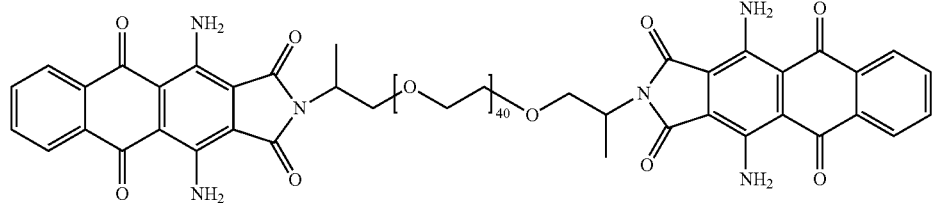
(Ibl)
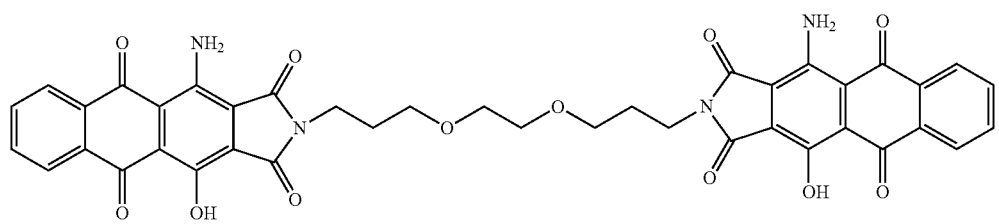
(Ibm)
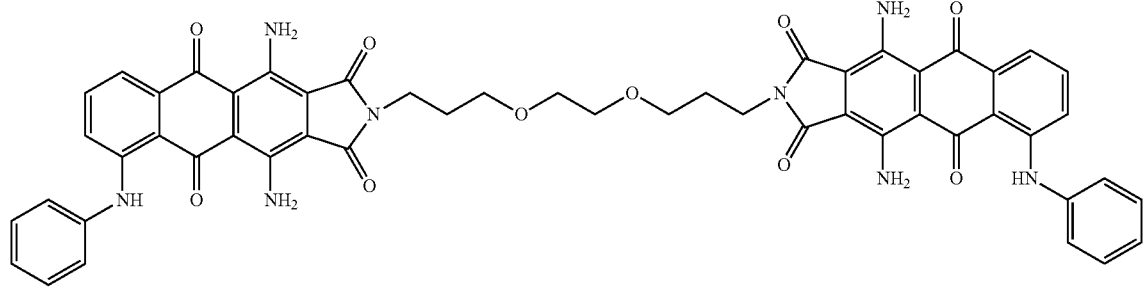
(Ibn)
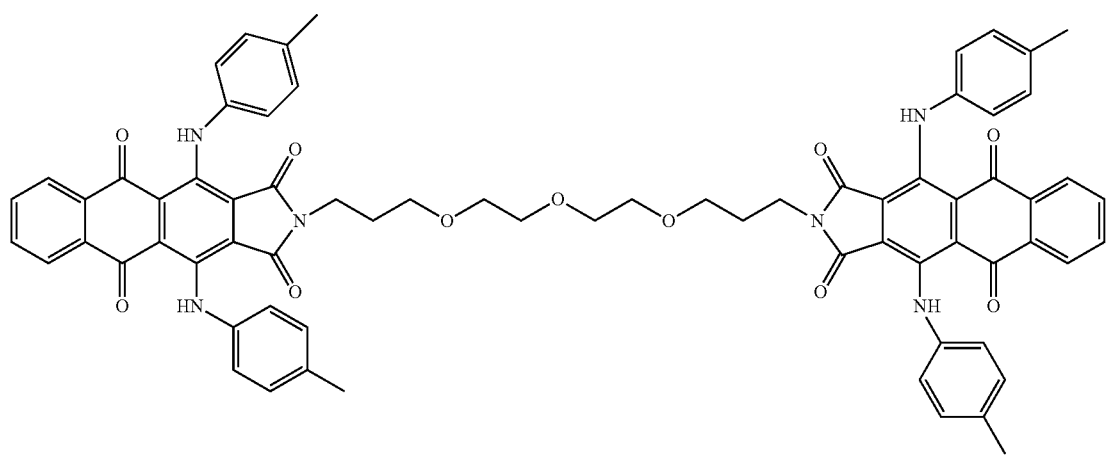
(Ibo)
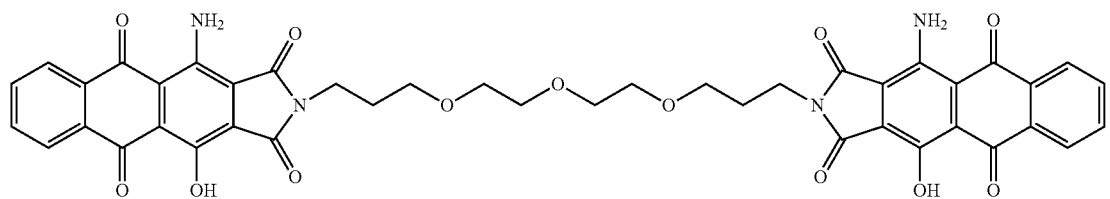
(Ibp)

-continued
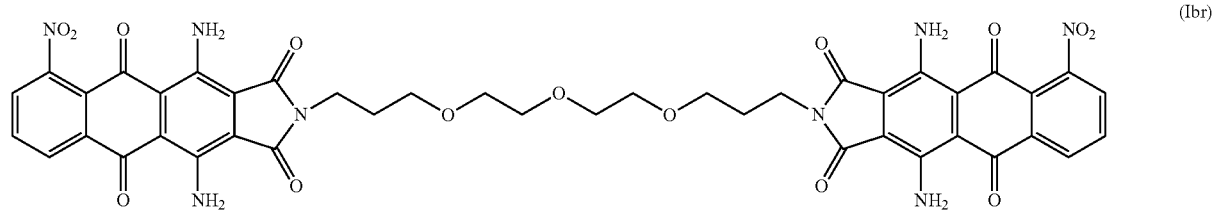
(Ibr)
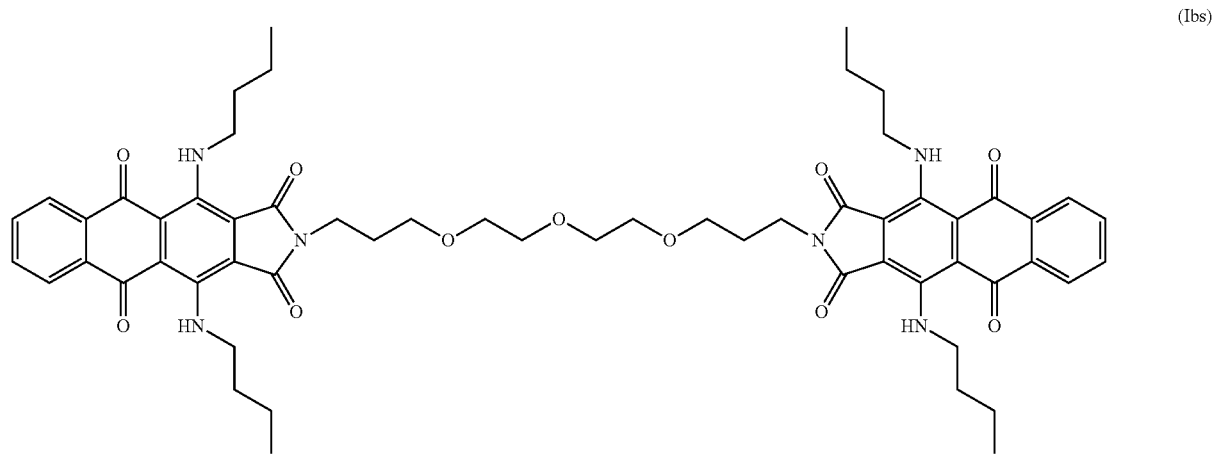
(Ibs)
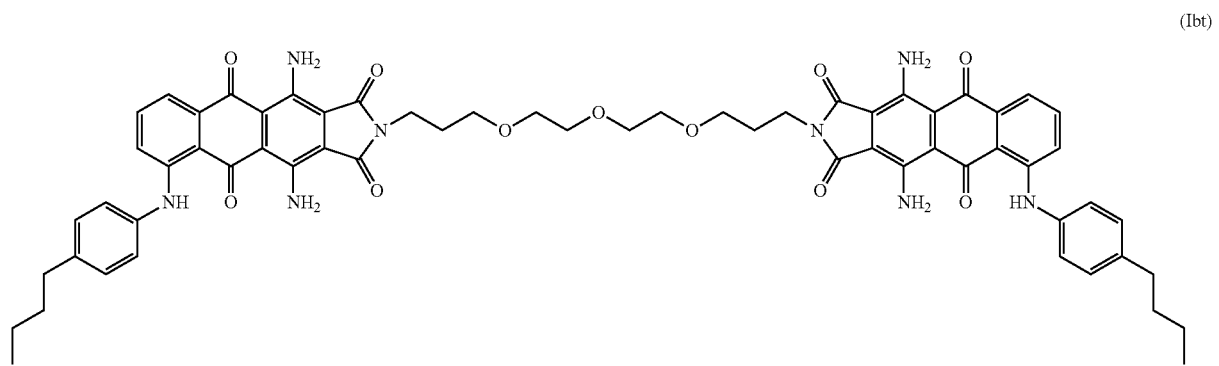
(Ibt)
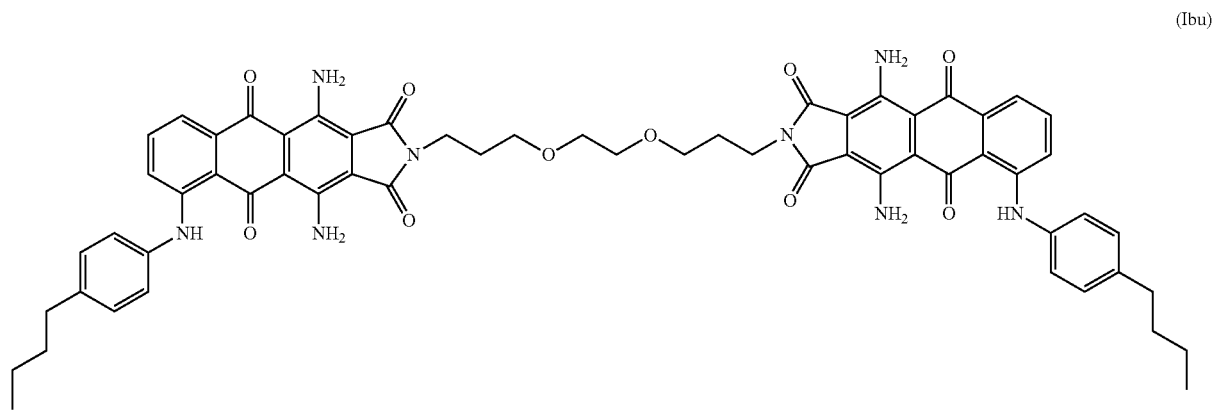
(Ibu)

Further particularly preferred dyes of formula (I) according to the present invention conform to formula (Ic)

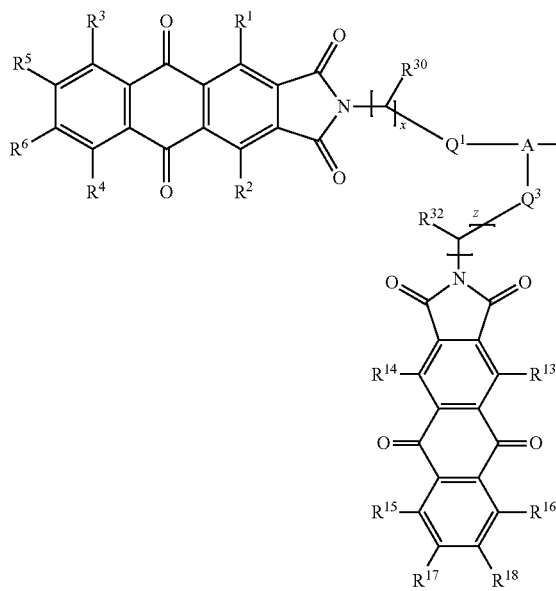

(Ic)

where
R$^1$ to R$^{18}$ each independently represent hydrogen, (C$_1$-C$_5$)-alkyl; trifluoromethyl; aryl; halogen; cyano; nitro; hydroxyl; (C$_1$-C$_{15}$)-alkoxy; aryloxy; arylcarbonyl, (C$_2$-C$_{15}$)-acylamino; (C$_1$-C$_{15}$)-alkylsulfonylamino; arylsulfonylamino; arylcarbonylamino; carbamoyl; amino; mono-cyclo-(C$_3$-C$_8$)-alkyl-amino; mono-(C$_1$-C$_{15}$)-alkyl-amino; di(cyclo)-(C$_3$-C$_8$)-alkyl-amino; di-(C$_1$-C$_{15}$)-alkyl-amino; monoaryl-amino; diaryl-amino; monocyclo-(C$_3$-C$_8$)-alkylmonoarylamino; mono-(C$_1$-C$_{15}$)-alkylmonoarylamino; aminocarbonylamino; sulfamoyl; aminosulfonylamino; (C$_1$-C$_{15}$)-alkylthio; arylthio or (C$_1$-C$_4$)-alkylsulfonyl;
or each independently represent (C$_1$-C$_{15}$)-alkyl, N-mono-(C$_1$-C$_{15}$)-alkylamino, N-monocyclo-(C$_3$-C$_8$)-alkylamino, N,N-di-(C$_1$-C$_{15}$)-alkylamino, N,N-dicyclo-(C$_3$-C$_8$)-alkylamino, N—(C$_1$-C$_{15}$)-alkyl-N-cyclo-(C$_3$-C$_8$)-alkylamino, N—(C$_1$-C$_{15}$)-alkyl-N-arylamino, N-aryl-N-cyclo-(C$_3$-C$_8$)-alkylamino, (C$_1$-C$_{15}$)-alkoxy, (C$_1$-C$_{15}$)-alkylthio or (C$_1$-C$_{15}$)-alkylsulfonyl which are each substituted by one or more substituents selected from the group consisting of hydroxyl, heteroaryl, heterocycloalkyl, aryl, aryloxy, (C$_1$-C$_{15}$)-alkoxy, halogen, cyano, (C$_1$-C$_{15}$)-alkoxycarbonyl, carbamoyl, sulfamoyl, nitro, amino, (C$_2$-C$_{15}$)-acylamino, arylcarbonylamino, (C$_1$-C$_{15}$)-alkylsulfonylamino, arylsulfonylamino, aminocarbonylamino and aminosulfonylamino; or each independently represent aryl, monoaryl-amino; diaryl-amino, aryloxy, arylthio, arylcarbonyl, arylcarbonyloxy; arylsulfonylamino; arylcarbonylamino, mono-cyclo-(C$_3$-C$_8$)-alkylmonoarylamino; mono-(C$_1$-C$_{15}$)-alkylmonoaryl-amino or arylsulfonyl, wherein aryl is substituted by one or more substituents selected from the group consisting of hydroxyl, (C$_1$-C$_{15}$)-alkyl, (C$_1$-C$_{15}$)-alkoxy, (C$_1$-C$_{15}$)-alkylthio, halogen, cyano, (C$_1$-C$_{15}$)-alkoxycarbonyl, (C$_2$-C$_{15}$)-acyloxy, carbamoyl, N-mono-(C$_1$-C$_{15}$)-alkyl-carbamoyl, N-mono-(hydroxy-(C$_1$-C$_{15}$)-alkyl)carbamoyl, sulfamoyl, N-mono-(C$_1$-C$_{15}$)-alkyl-sulfamoyl, N-mono-(hydroxy-(C$_1$-C$_{15}$)-alkyl)sulfamoyl, nitro, amino, (C$_2$-C$_{15}$)-acylamino, (C$_1$-C$_{15}$)-alkylsulfonylamino, aminocarbonylamino, N-mono-(C$_1$-C$_{15}$)-alkylamino, N-mono-(hydroxy-(C$_1$-C$_{15}$)-alkyl)amino, N,N-bis-(hydroxy-(C$_1$-C$_{15}$)-alkyl)amino, N,N-di-(C$_1$-C$_{15}$)-alkyl-amino and aminosulfonylamino;
R$^{30}$ to R$^{32}$ each independently represent hydrogen, (C$_1$-C$_{15}$)-alkyl; singly or multiply oxygen-interrupted (C$_1$-C$_{15}$)-alkyl, aryl, aryl-(C$_1$-C$_{15}$)-alkyl, (C$_1$-C$_{15}$)-alkyl-aryl, aryloxy, (C$_1$-C$_{15}$)-alkoxy, monohydroxy-(C$_1$-C$_{15}$)-alkyl or polyhydroxy-(C$_1$-C$_{15}$)-alkyl;
x represents a number from 1 to 10;
y represents a number from 0 to 10; and
z represents a number from 0 to 10; and
Q$^1$, Q$^2$, Q$^3$ and A are each as defined above.
In particularly preferred compounds of formula (Ic)
R$^1$, R$^2$, R$^7$, R$^8$, R$^{13}$ and R$^{14}$ each independently represent amino, hydroxyl, mono-(C$_1$-C$_{15}$)-alkyl-amino or monoaryl-amino, where aryl is substituted by (C$_1$-C$_{15}$)-alkyl, sulfamoyl, carbamoyl, N-mono-(hydroxy-(C$_1$-C$_{15}$)-alkyl)sulfamoyl or N-mono-(hydroxy-(C$_1$-C$_{15}$)-alkyl)carbamoyl;
R$^3$, R$^4$, R$^5$, R$^6$, R$^9$, R$^{10}$, R$^{11}$, R$^{12}$, R$^{15}$, R$^{16}$, R$^{17}$ and R$^{18}$ each independently represent hydrogen, amino, hydroxy, nitro, mono-(C$_1$-C$_{15}$)-alkyl-amino and monoaryl-amino, wherein aryl is substituted by (C$_1$-C$_{15}$)-alkyl;
R$^{30}$ to R$^{32}$ represent hydrogen or (C$_1$-C$_{15}$)-alkyl;
x represents 1, 2, 3 or 4;
y represents 0, 1 or 2; and
z represents 0, 1 or 2;
A represents a group of formula (5), where R$^{27}$ represents hydrogen or (C$_1$-C$_{15}$)-alkyl and a, b and c each independently represent a number from 0 to 5; and
Q$^1$, Q$^2$ and Q$^3$ each independently represent a group of formula (4) wherein r represents a rational number from 0.1 to 100 and has identical or different meanings within any one molecule of formula (Ic); and
R$^{25}$ to R$^{26}$ each independently represent hydrogen or (C$_1$-C$_{15}$)-alkyl and
wherein R$^{25}$ and R$^{26}$ have identical or different meanings within any one molecule of formula (Ic); and wherein when $R^{25}$ and $R^{26}$ have different meanings within any one molecule of formula (Ic), these different meanings are randomly distributed or regions of respectively identical meanings follow each other.
Examples of compounds of formula (Ic) are the compounds of formulae (Ica) to (Ice)
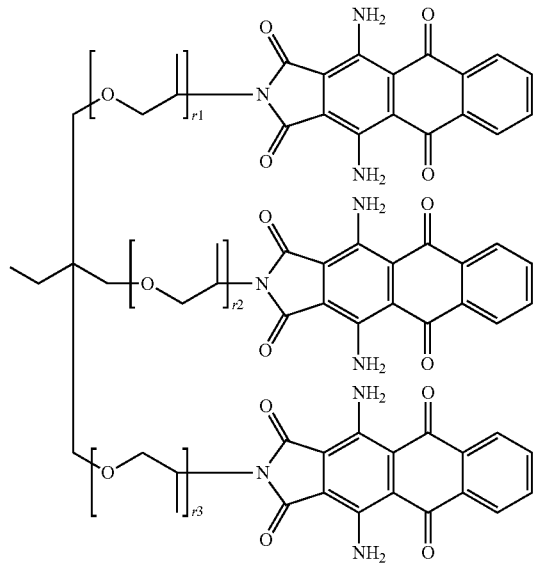
(Ica)
r1 + r2 + r3 = 5-6
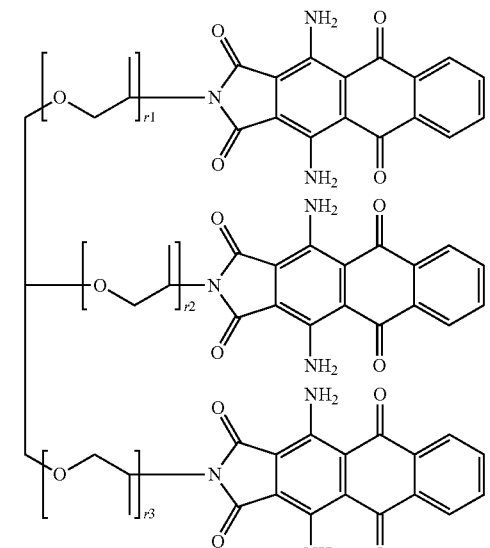
(Icb)
r1 + r2 + r3 = 50
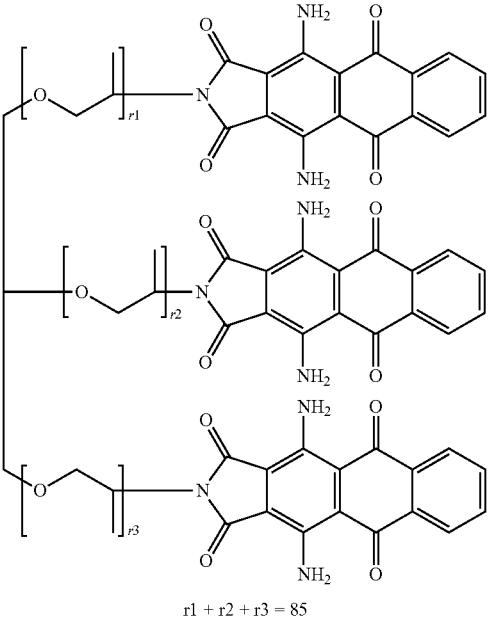
(Icc)
r1 + r2 + r3 = 85
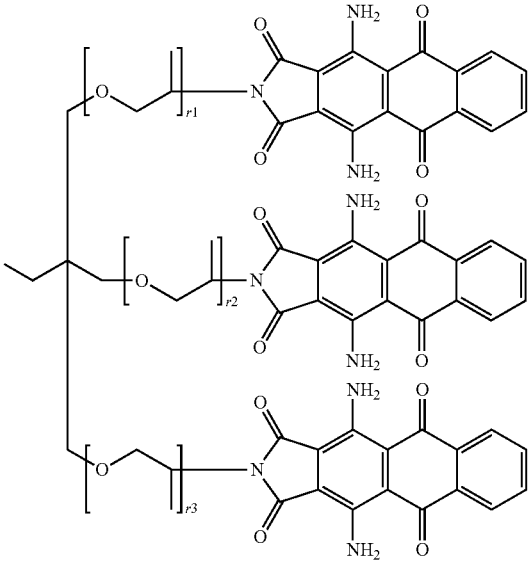
(Icd)
r1 + r2 + r3 = 5-6

-continued

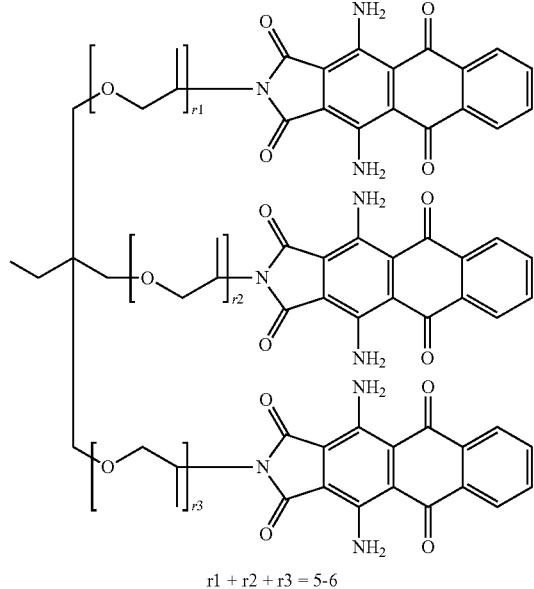

r1 + r2 + r3 = 5-6

Further particularly preferred dyes of formula (I) according to the present invention conform to formula (Id)

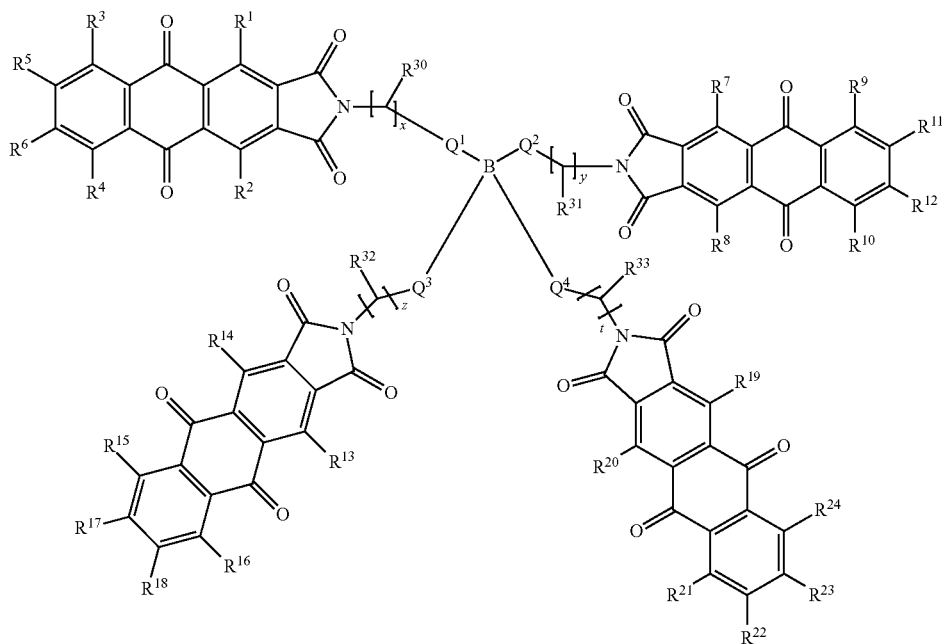

where
R$^1$ to R$^{24}$ each independently represent hydrogen; (C$_1$-C$_5$)-alkyl; trifluoromethyl; aryl; halogen; cyano; nitro; hydroxyl; (C$_1$-C$_{15}$)-alkoxy; aryloxy; arylcarbonyl, (C$_2$-C$_{15}$)-acylamino; (C$_1$-C$_{15}$)-alkylsulfonylamino; arylsulfonylamino; arylcarbonylamino; carbamoyl; amino; mono-cyclo-(C$_3$-C$_8$)-alkyl-amino; mono-(C$_1$-C$_{15}$)-alkyl-amino; di(cyclo)-(C$_3$-C$_3$)-alkyl-amino; di-(C$_1$-C$_{15}$)-alkyl-amino; monoaryl-amino; diaryl-amino; monocyclo-(C$_3$-C$_8$)-alkylmonoarylamino; mono-(C$_1$-C$_{15}$)-alkylmonoarylamino; aminocarbonylamino; sulfamoyl; aminosulfonylamino; (C$_1$-C$_{15}$)-alkylthio; arylthio or (C$_1$-C$_4$)-alkylsulfonyl;

or each independently represent (C$_1$-C$_{15}$)-alkyl, N-mono-(C$_1$-C$_{15}$)-alkylamino, N-monocyclo-(C$_3$-C$_8$)-alkylamino, N,N-dicyclo-(C$_3$-C$_8$)-alkylamino, N—(C$_1$-C$_{15}$)-alkyl-N-cyclo-(C$_3$-C$_8$)-alkylamino, N—(C$_1$-C$_{15}$)-alkyl-N-arylamino,
N-aryl-N-cyclo-(C$_3$-C$_8$)-alkylamino, (C$_1$-C$_{15}$)-alkoxy, (C$_1$-C$_{15}$)-alkylthio or (C$_1$-C$_{15}$)-alkylsulfonyl which are each substituted by one or more substituents selected from the group consisting of hydroxyl, heteroaryl, heterocycloalkyl, aryl, aryloxy, (C$_1$-C$_{15}$)-alkoxy, halogen, cyano, (C$_1$-C$_{15}$)-alkoxycarbonyl, carbamoyl, sulfamoyl, nitro, amino, (C$_2$-C$_{15}$)-acylamino, arylcarbonylamino, (C$_1$-C$_{15}$)-alkylsulfonylamino, arylsulfonyl-amino, aminocarbonylamino and aminosulfonylamino;
or each independently represent aryl, monoaryl-amino; diaryl-amino, aryloxy, arylthio, arylcarbonyl, arylcarbonyloxy; arylsulfonylamino; arylcarbonylamino, mono-cyclo-(C$_3$-C$_8$)-alkylmonoarylamino; mono-(C$_1$-C$_{15}$)-alkylmonoaryl-amino or arylsulfonyl, wherein aryl is substituted by one or more substituents selected from the group consisting of hydroxyl, (C$_1$-C$_{15}$)-alkyl, (C$_1$-C$_{15}$)-alkoxy, (C$_1$-C$_{15}$)-alkylthio, halogen, cyano, (C$_1$-C$_{15}$)-alkoxycarbonyl, (C$_2$-C$_{15}$)-acyloxy, carbamoyl, N-mono-(C$_1$-C$_{15}$)-alkyl-carbamoyl, N-mono-(hydroxy-(C$_1$-C$_{15}$)-alkyl)carbamoyl, sulfamoyl, N-mono-(C$_1$-C$_{15}$)-alkylsulfamoyl, N-mono-(hydroxy-(C$_1$-C$_{15}$)-alkyl)sulfamoyl, nitro, amino, (C$_2$-C$_{15}$)-acylamino, (C$_1$-C$_{15}$)-alkylsulfonylamino, aminocarbonylamino, N-mono-(C$_1$-C$_{15}$)-alkylamino, N-mono-(hydroxy-(C$_1$-C$_{15}$)-alkyl)amino, N,N-bis-(hydroxy-(C$_1$-C$_{15}$)-alkyl)amino, N,N-di-(C$_1$-C$_{15}$)-alkyl-amino and aminosulfonylamino;
R$^{30}$ to R$^{33}$ each independently represent hydrogen, (C$_1$-C$_{15}$)-alkyl; singly or multiply oxygen-interrupted (C$_1$-C$_{15}$) alkyl, aryl, aryl-(C$_1$-C$_{15}$)-alkyl, (C$_1$-C$_{15}$)-alkyl-aryl, aryloxy, (C$_1$-C$_{15}$)-alkoxy, monohydroxy-(C$_1$-C$_{15}$)-alkyl or polyhydroxy-(C$_1$-C$_{15}$)-alkyl;
x represents a number from 1 to 10;
y represents a number from 0 to 10;

z represents a number from 0 to 10; and
t represents a number from 0 bis 10; and
$Q^1$, $Q^2$, $Q^3$, $Q^4$ and B are each as defined above.

In particularly preferred compounds of formula (Id)

$R^1$, $R^2$, $R^7$, $R^8$, $R^{13}$, $R^{14}$, $R^{19}$ and $R^{20}$ each independently represent amino, hydroxyl, mono-($C_1$-$C_{15}$)-alkyl-amino or monoaryl-amino, wherein aryl is substituted by ($C_1$-$C_{15}$)-alkyl, sulfamoyl, carbamoyl, n-mono-(hydroxy-($C_1$-$C_{15}$)-alkyl)sulfamoyl or N-mono-(hydroxy-($C_1$-$C_{15}$)-alkyl)carbamoyl;

$R^3$, $R^4$, $R^5$, $R^6$, $R^9$, $R^{10}$, $R^{11}$, $R^{12}$, $R^{15}$, $R^{16}$, $R^{17}$, $R^{18}$, $R^{21}$, $R^{22}$, $R^{23}$ and $R^{24}$ each independently represent hydrogen, amino, hydroxy, nitro, mono-($C_1$-$C_{15}$)-alkyl-amino or monoaryl-amino, wherein aryl is substituted by ($C_1$-$C_{15}$)-alkyl;

$R^{30}$ to $R^{33}$ each independently represent $R^{30}$ to $R^{35}$ hydrogen or ($C_1$-$C_{15}$)alkyl;

x represents 1, 2, 3 or 4;

y represents 0, 1 or 2;
z represents 0, 1 or 2; and
t represents 0, 1 or 2;

B represents a group of formula (6) wherein a, b, c and d each independently represent a number from 0 to 5; and $Q^1$, $Q^2$, $Q^3$ and $Q^4$ each independently represent a group of formula (4) wherein r represents a rational number from 0.1 to 100 and has identical or different meanings within any one molecule of formula (Id); and $R^{25}$ to $R^{26}$ each independently represent hydrogen or ($C_1$-$C_{15}$)-alkyl and wherein $R^{25}$ and $R^{26}$ have identical or different meanings within any one molecule of formula (Id); and wherein when $R^{25}$ and $R^{26}$ have different meanings within any one molecule of formula (Id), these different meanings are randomly distributed or regions of respectively identical meanings follow each other.

Examples of compounds of formula (Id) are the compounds of formulae (Ida) to (Idd)

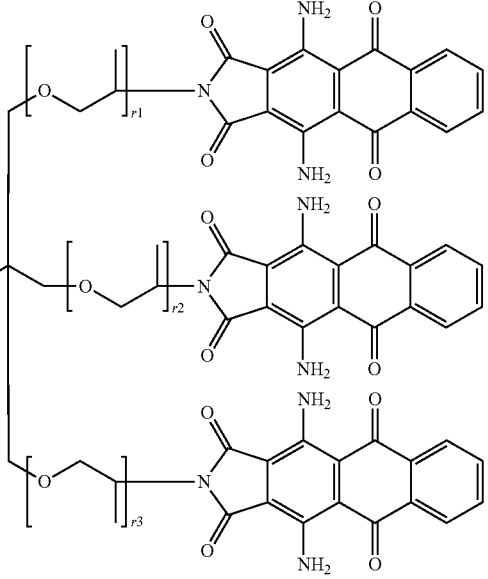
(Ida)

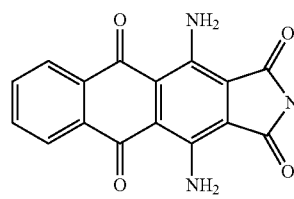

r1 + r2 + r3 + r4 = 100

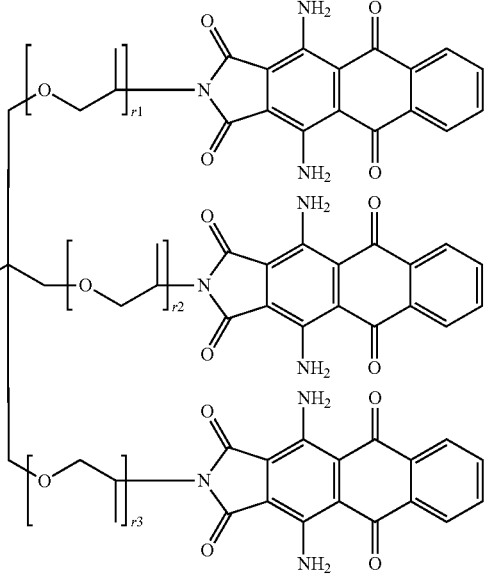
(Idb)

r1 + r2 + r3 + r4 = 50

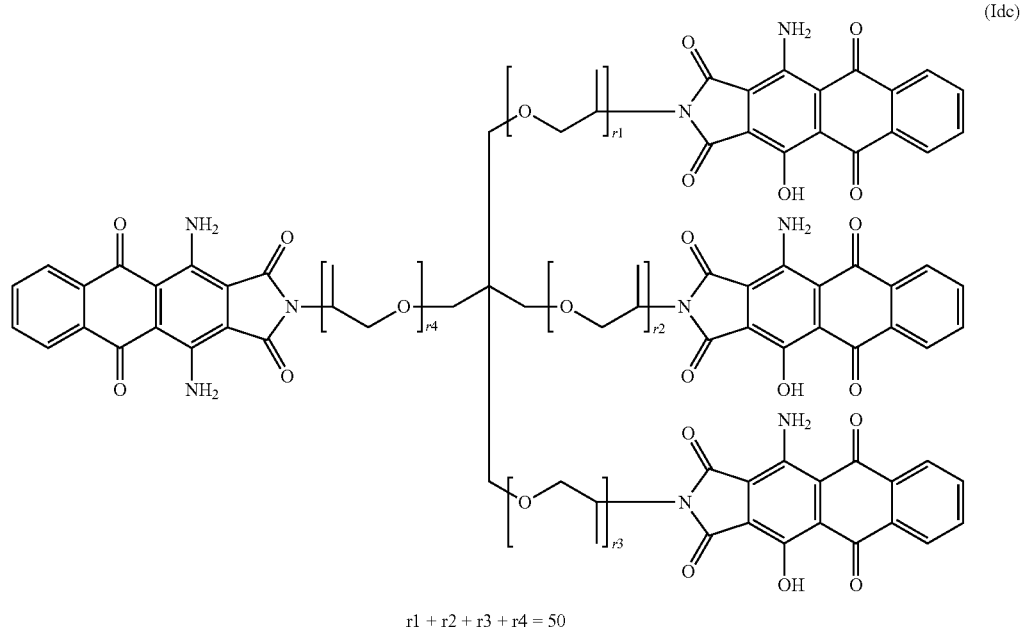
r1 + r2 + r3 + r4 = 50
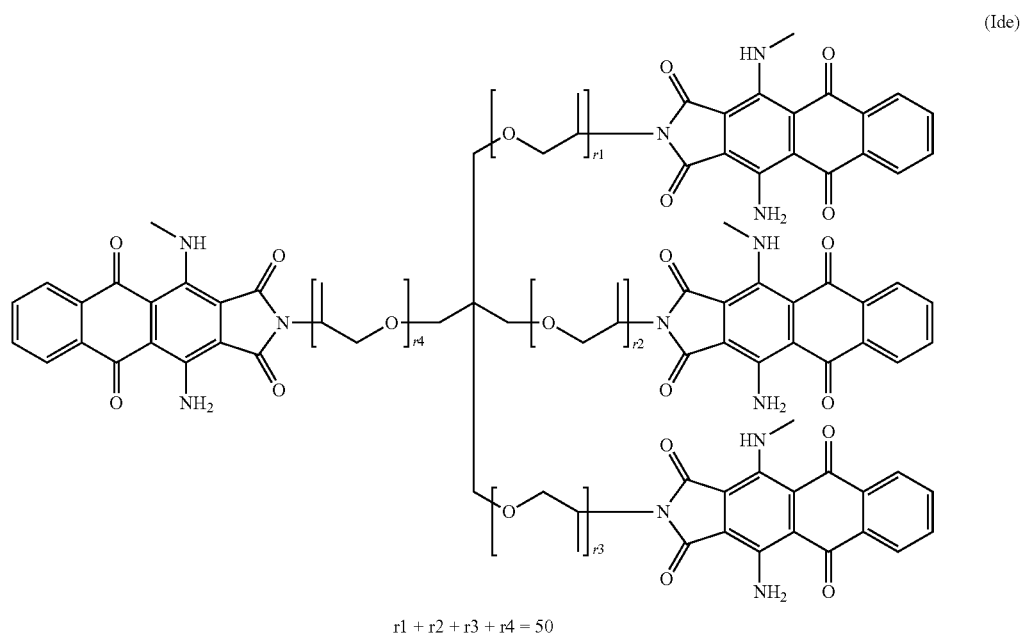
r1 + r2 + r3 + r4 = 50
The compounds of formula (I) according to the present invention are obtainable for example by a compound of formula (II)
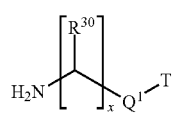
(II)
where $R^{30}$, $Q^1$, T and x are each as defined above, being reacted with a compound of formula (III)
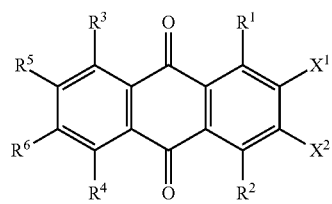
(III)

where
R¹ to R⁶ are each as defined above and
X¹ and X² each represent —COOH or —CN or together represent —CO—O—OC— or —CO—NH—OC—.

Compounds of formula (III) are the compounds of formulae (IIIa) to (IIId)

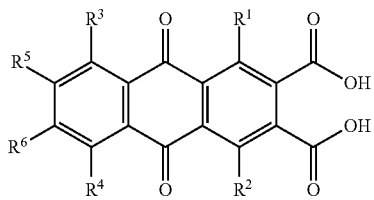
(IIIa)

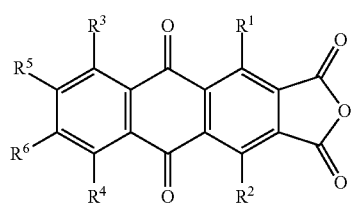
(IIIb)

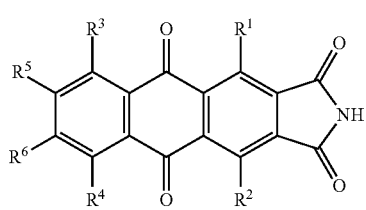
(IIIc)

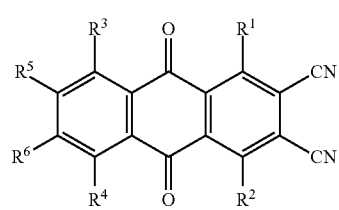
(IIId)

Preferred compounds of formula (III) are the compounds of formulae (IIIe) to (IIIh)

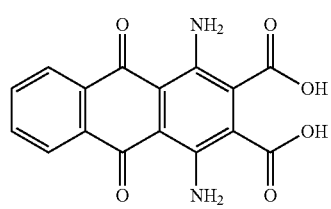
(IIIe)

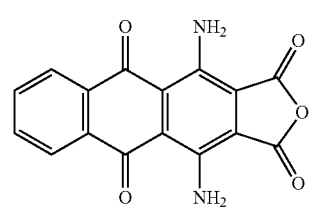
(IIIf)

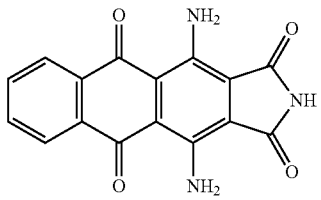
(IIIg)

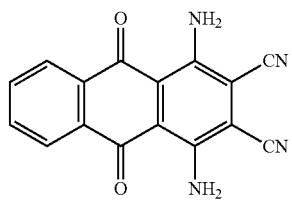
(IIIh)

Compounds of formula (Ib) are preferably prepared by reacting a compound of formula (IV)

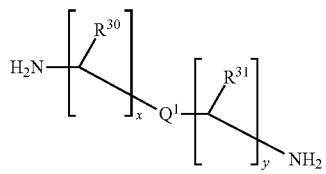
(IV)

wherein $R^{30}$ and $R^{31}$, $Q^1$, x and y are each as defined above, with a compound of formula (III).

Compounds of formula (Ic) are preferably prepared by reacting a compound of formula (V)

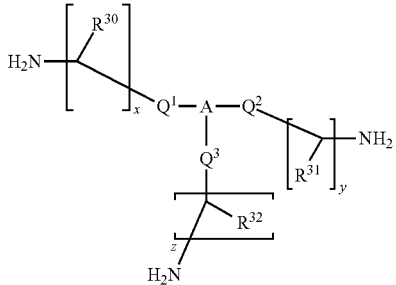
(V)

where $R^{30}$ to $R^{32}$, $Q^1$ to $Q^3$, x, y and z are each as defined above, with a compound of formula (III).

Compounds of formula (Id) are preferably prepared by reacting a compound of formula (VI)

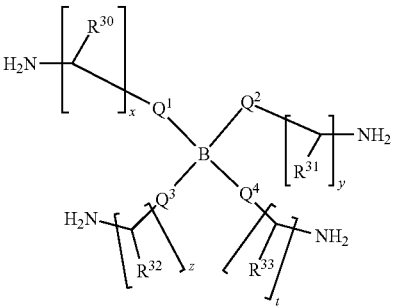
(VI)

where $R^{30}$ to $R^{33}$, $Q^1$ to $Q^4$, x, y, z and t are each as defined above, with a compound of formula (III).

The compounds of formula (III) are known and obtainable by methods known in the literature.

The compounds of formulae (IV), (V) and (VI) are likewise known and obtainable by methods known in the literature. They are also commercially available, for example under the brand name of Jeffamine® from Huntsman, The Woodlands, Tex., USA. Examples of such products are Jeffamine M-600, Jeffamine M-2005, Jeffamine M-2070, Jeffamine M-1000, Jeffamine D-230, Jeffamine D-400, Jeffamine D-2000, Jeffamine D-4000, Jeffamine HK-511, Jeffamine ED-600, Jeffamine ED-900, Jeffamine ED-2003, Jeffamine ED-2001, Jeffamine EDR-148, Jeffamine EDR-176, Jeffamine T-403, Jeffamine M-3000, Jeffamine T-5000, Jeffamine XTJ-435, Jeffamine XTJ-436.

Owing to the nature of their synthesis, many of the compounds of formulae (IV), (V) and (VI) present as random polymeric mixtures and therefore their reaction will again give rise to mixtures. Depending on the choice of starting compounds, the synthesis of compounds of the formula (I) gives rise to compositions of matter which likewise form part of the subject matter of the present invention.

The abovementioned reactions are preferably carried out at temperatures of 80 to 250° C., more preferably at 110 to 210° C. in the presence or absence of a catalyst. Examples of suitable catalysts are Lewis acid catalysts, which include, for example, metal halides, metal oxides, metal carboxylates and organometallic compounds.

The reaction can be carried out without solvent, in an inert solvent, or in a mixture of inert solvents.

When no solvent is used, the reaction is advantageously carried out using an excess of the compound of formula (IV), (V) or (VI) used. Suitable solvents include alcohols such as, for example, n-butanol, n-pentanol, 1-methoxy-2-propanol, 2-ethylhexanol, 2-methyl-1-butanol, isoamyl alcohol, benzyl alcohol, cyclohexanol, glycols and their derivatives, such as, for example, ethylene glycol diethyl ether, ethylene glycol monomethyl ether, ethylene glycol monoethyl ether, ethylene glycol monoisopropyl ether, ethylene glycol monobutyl ether, diethylene glycol dimethyl ether, diethylene glycol diethyl ether, diethylene glycol monomethyl ether, ethylene glycol, diethylene glycol monoethyl ether, dipropylene glycol, ethers such as, for example, dibutyl ether, diisobutyl ether, diisoamyl ether, di-n-amyl ether, chlorinated solvents such as chlorobenzene or 1,2-dichlorobenzene, or further polar or apolar inert solvents such as, for example, ethylbenzene, anisole, n-dimethylformamide, N,N-dimethylacetamide, sulfolane, N-methylpyrrolidone, toluene, 1,2-xylene, 1,3-xylene, 1,4-xylene or mixtures thereof.

After they have been synthesized, the compounds of formula (I) can be isolated by filtration, extraction or evaporation and, if necessary, drying. However, they can also be used without further workup.

The compounds of formula (I) according to the present invention can be used directly for polymer coloration, or they are subjected to a finishing (conditioning) operation to convert them into a saleable dye preparation.

Finishing can be effected proceeding from a single compound of formula (I) or from a mixture of two more compounds of formula (I) or mixtures of one or more of the compounds of formula (I) and dyes of other dye classes, for example pigments or solvent dyes, if appropriate with the assistance of auxiliaries, for example surface modifiers and dispersants by dispersing, suspending or dissolving in a liquid or solid carrier material and also if appropriate standardizing to a desired color strength and a desired hue and if appropriate drying the preparation thus obtained.

The dye preparations containing compounds of formula (I) may also contain auxiliaries for modifying the viscosity or flowability.

Suitable auxiliaries of this kind are described for example in U.S. Pat. No. 6,605,126. Preferred examples are ethylene glycols, propylene glycols, polyether polyols, polyester polyols, lactones and carbonic esters.

The present invention accordingly also provides dye preparations comprising one or more compounds of formula (I) and also one or more auxiliaries for modifying the viscosity or flowability.

These dye preparations preferably contain one or more compounds of formula (I) in amounts of 5% to 100% by weight and one or more auxiliaries for modifying the viscosity or flowability in amounts of 0% to 95% by weight, all based on the dye preparation.

The present invention further provides for the use of the compounds of formula (I) according to the present invention for coloring a polymer. A possible procedure is for the compounds of formula (I) to be admixed to the polymer.

In addition, compounds of formula (I) according to the present invention can also be used in the form of masterbatches. Masterbatches are dye concentrates consisting of carrier materials and colorants, the colorants being present in higher concentration than in the final use and the carrier materials being constituted such that they have compatibility with the materials to be colored. The carrier materials used can be polymers, for example polyolefins, polyvinyl chloride, polyesters, polyamides, polycarbonates or polystyrene. Preferred polymers are polyolefins, for example polyethylene or polypropylene, and copolymers with polyolefins. Useful carrier materials further include paraffin oils and polyglycols. The dye masterbatches are characterized in particular in that they contain one or more compounds of formula (I) according to the present invention in amounts of 5% to 60% by weight and one or more carrier materials in amounts of 40% to 95% by weight.

The compounds of formula (I) have advantages in bleed/migration fastness in polyolefin mass coloration in particular compared with commercially available solvent dyes. These advantages are particularly noticeable in the coloration of polypropylene, polypropylene copolymers and polypropylene blends. To achieve good bleed fastnesses for the colored polymer, it is preferable to use the compounds of formula (I) that have a sufficiently high molar mass.

The examples hereinbelow serve to elucidate the invention without restricting the invention to these examples. Parts and percentages are by weight, unless otherwise stated. Parts by weight relate to parts by volume as the kilogram relates to the liter.

The Jeffamine® products mentioned hereinafter were obtained as fine chemicals from Aldrich, Fluka or Merck or as research samples from Huntsman.

EXAMPLE 1 a) A mixture of 1.14 parts of 1,13-diamino-4,7,10-trioxamidecane, 100 parts of n-pentanol and 1.75 parts of the compound of formula (IIIf) is stirred under reflux at the boiling temperature of the mixture for 10 hours, cooled down and filtered, and the filter residue is washed with ethanol, dilute sodium carbonate solution and water and dried to leave the compound of formula (Iba).

b) 1 g of the dye obtained as per a) is comminuted in a mortar and added to altogether 2 kg of polypropylene pellet (Moplen RP340R from Basell). This mixture is mulled on a roller mill for homogenization and then extruded in a twin-screw extruder (ZSE 18HP-D40 from Leistritz) and pelletized. The pellet obtained can be processed in an injection-molding machine (420 C 1000-100 from Arburg) to form transparent blue sample plaques. The dye has good bleed fastness as per prEN14469-4, a high color stability to heat as per EN12877-2 and high lightfastness as per EN ISO 105-B01.

EXAMPLE 2

A mixture of 1.15 parts of the commercially available compound of formula (IVa)

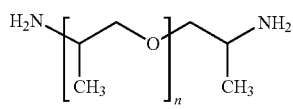

where n is about 2.5 (Jeffamine® D-230), 100 parts of n-pentanol and 3.7 parts of the compound of formula (IIIf) is stirred under reflux at the boiling temperature of the mixture for 8 hours, cooled down and filtered, and the filter residue is washed with ethanol, dilute sodium carbonate solution and water and dried to leave the compound of formula (Ibb).

EXAMPLE 3

A mixture of 2.11 parts of the commercially available compound of formula (IVa), where n is about 6.1 (Jeffamine® D-400), 100 parts of n-pentanol and 3.7 parts of the compound of formula (IIIf) is stirred under reflux at the boiling temperature of the mixture for 8 hours, cooled down and filtered, and the filter residue is washed with ethanol, dilute sodium carbonate solution and water and dried to leave the compound of formula (Ibc).

EXAMPLE 4 a) A mixture of 1.32 parts of the commercially available compound of formula (Va)

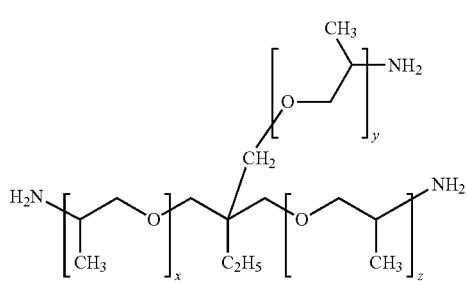

where (x+y+z) is 5-6 (Jeffamine® T-403), 100 parts of n-pentanol and 2.77 parts of the compound of formula (IIIf) is stirred under reflux at the boiling temperature of the mixture for 6 hours, cooled down and filtered, and the filter residue is washed with ethanol, dilute sodium carbonate solution and water and dried to leave the compound of formula (Ica).

b) 1 g of the dye obtained as per a) is comminuted in a mortar and added to altogether 2 kg of polypropylene pellet (Moplen RP340R from Basell). This mixture is mulled on a roller mill for homogenization and then extruded in a twin-screw extruder (ZSE 18HP-D40 from Leistritz) and pelletized. The pellet obtained can be processed in an injection-molding machine (420 C 1000-100 from Arburg) to form transparent blue sample plaques. The dye has good bleed fastness as per prEN14469-4, a high color stability to heat as per EN12877-2 and high lightfastness as per EN ISO 105-B01.

c) 200 g of the dye obtained as per 4a) is comminuted in a mortar and added to altogether 1.8 kg of polypropylene pellet (Moplen RP340R from Basell). This mixture is mulled on a roller mill for homogenization and then extruded in a twin-screw extruder (ZSE 18HP-D40 from Leistritz) and pelletized.

40 g of the Masterbatch pellet thus obtained are mixed with 1.96 kg of polypropylene pellet (Moplen RP340R from Basell) and subsequently extruded in a twin-screw extruder (ZSE 18HP-D40 from Leistritz) and pelletized.

The pellet obtained can be processed in an injection-molding machine (420 C 1000-100 from Arburg) to form transparent blue sample plaques. The dye has good bleed fastness as per prEN14469-4, a high color stability to heat as per EN12877-2 and high lightfastness as per EN ISO 105-B01.

EXAMPLE 5

A mixture of 22.73 parts of the commercially available compound of formula (IVb)

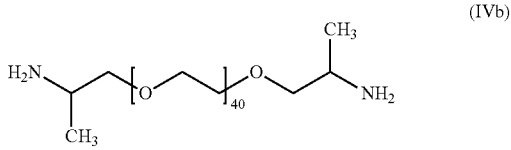

(Jeffamine® ED-2001) and 7.4 parts of the compound of formula (IIIf) is heated to 140° C. and stirred at that temperature for 7 hours. After cooling, the reaction mixture is dissolved in methylene chloride, the solution is filtered, the filtrate is washed with dilute sodium carbonate solution, dilute hydrochloric acid and water, dried with sodium sulfate and the organic solvent is evaporated in vacuo to leave the compound of formula (Ibl).

EXAMPLE 6

A mixture of 40 parts of the commercially available compound of formula (IVa) where n is about 68 (Jeffamine® D-4000) and 6.17 parts of the compound of formula (IIIf) is heated to 140° C. and stirred at that temperature for 8 hours. After cooling, the reaction mixture is dissolved in methylene chloride, the solution is filtered, the filtrate is washed with dilute sodium carbonate solution, dilute hydrochloric acid and water, dried with sodium sulfate and the organic solvent is evaporated in vacuo to leave the compound of formula (Ibe).

EXAMPLE 7

A mixture of 20 parts of the commercially available compound of formula (IVa) where n is about 33 (Jeffamine® D-2000) and 6.17 parts of the compound of formula (IIIf) is heated to 140° C. and stirred at that temperature for 8 hours. After cooling, the reaction mixture is dissolved in methylene chloride, the solution is filtered, the filtrate is washed with dilute sodium carbonate solution, dilute hydrochloric acid and water, dried with sodium sulfate and the organic solvent is evaporated in vacuo to leave the compound of formula (Ibd).

EXAMPLE 8 a) A mixture of 20 parts of the commercially available compound of formula (IVc)

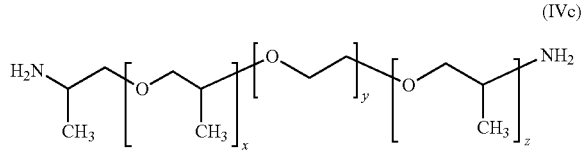

(IVc)

where y is about 39 and (x+z) is about 6 (Jeffamine® ED-2003) and 6.17 parts of the compound of formula (IIIf) is heated to 140° C. and stirred at that temperature for 8 hours. After cooling, the reaction mixture is dissolved in methylene chloride, the solution is filtered, the filtrate is washed with dilute sodium carbonate solution, dilute hydrochloric acid and water, dried with sodium sulfate and the organic solvent is evaporated in vacuo to leave the compound of formula (Ibi).

b) 3 g of the dye obtained as per a) are dissolved in 8 ml of methylene chloride (DYGG3205) and added to 2 kg of polypropylene pellet (Moplen RP340R from Basell) and subsequently methylene chloride is removed in a rotary evaporator. The dried pellet is extruded in a twin-screw extruder (ZSE 18HP-D40 from Leistritz) and pelletized. The pellet obtained can be processed on an injection-molding machine (420 C 1000-100 from Arburg) to form blue sample plaques. The dye has very good bleed fastness as per prEN14469-4.

EXAMPLE 9

A mixture of 2.2 parts of the commercially available compound of formula (IVd)

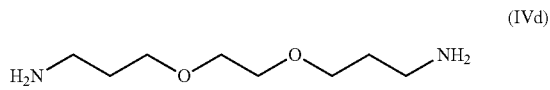 [SMILES: NCCCOCCOCCCN]

(IVd)

(Jeffamine® EDR-176), 7.0 parts of the compound of formula (IIIg) and 150 parts of n-pentanol is heated to the refluxing point and stirred at that temperature for 8 hours. After cooling, the reaction mixture is filtered and the precipitate obtained is washed with warm methanol and dried in vacuo to leave the compound of formula (Ibk).

COMPARATIVE EXAMPLE 1

1 g of the dye Colour Index Disperse Blue 60 of the structure

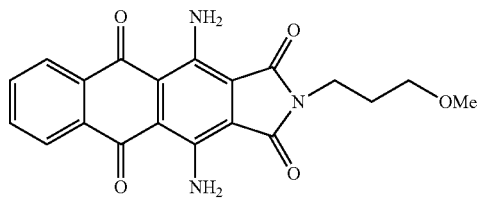 [SMILES: COCCCn1c(=O)c2c(N)c3c(=O)c4ccccc4c(=O)c3c(N)c2c1=O]

is comminuted in a mortar and added to altogether 2 kg of polypropylene pellet (Moplen RP340R from Basell). This mixture is mulled on a roller mill for homogenization and subsequently extruded in a twin-screw extruder (ZSE 18HP-D40 from Leistritz) and pelletized. The pellet obtained can be processed in an injection-molding machine (420 C 1000-100 from Arburg) to form transparent blue sample plaques.

The prEN14469-4 bleed fastness of the product thus obtained and also of the products obtained according to Examples 1, 4 and 8 was determined; the results are as follows:

| Example | 1 | 4 | 8 | Comparative Example 1 |
|---|---|---|---|---|
| Bleed fastness | 3-4 | 3-4 | 4-5 | 1-2 |

What is claimed is:
1. A compound of formula (I)

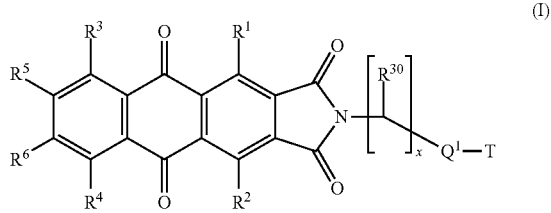

(I)

where
T represents, hydroxyl, amino, mono-$(C_1-C_{15})$-alkylamino, bis-$(C_1-C_{15})$-alkylamino, aryl, aryloxy, , monohydroxy-$(C_1-C_{15})$-alkyl, polyhydroxy-$(C_1-C_{15})$-alkyl or $(C_1-C_{15})$-alkyl-aryloxy
or represents a group of formula (1)

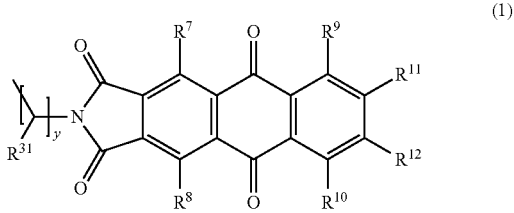

(1)

or represents a group of formula (2)

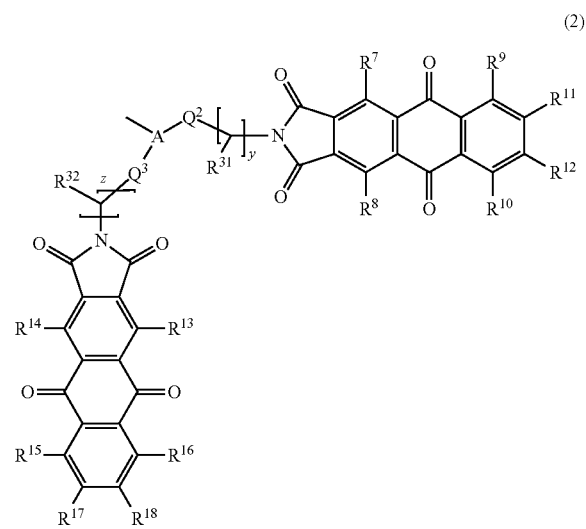

(2)

or represents a group of formula (3)

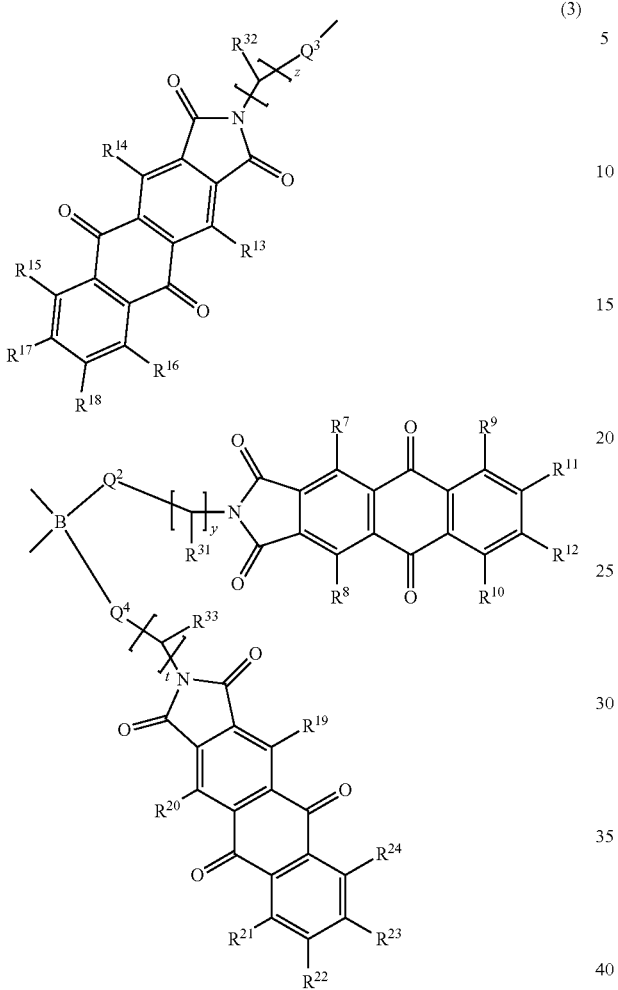

$Q^1$ to $Q^4$ each represents a group of formula (4)

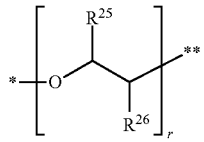

where r represents a rational number from 0.1 to 200 and has identical or different meanings within any one molecule of formula (I);

$R^{25}$ and $R^{26}$ each dependently represent hydrogen, ($C_1$-$C_{15}$)-alkyl, singly or multiply oxygen-interrupted ($C_1$-$C_{15}$)-alkyl, aryl, aryloxy, ($C_1$-$C_{15}$)-alkoxy, monohydroxy-($C_1$-$C_{15}$)-alkyl or polyhydroxy-($C_1$-$C_{15}$)alkyl;

and where $R^{25}$ and $R^{26}$ have identical or different meanings within any one molecule of formula (I); and where when $R^{25}$ and $R^{26}$ have different meanings within any one molecule of formula (I) these different meanings are randomly distributed or regions of respectively identical meanings follow each other; and wherein the groups T, A and B are bonded to the bond * or to the bond **;

$R^1$ to $R^{24}$ each independently represent hydrogen; ($C_1$-$C_{15}$)-alkyl; trifluoromethyl; cyclo-($C_3$-$C_8$)-alkyl; aryl; heteroaryl; heterocycloalkyl; halogen; cyano; nitro; hydroxyl; ($C_1$-$C_{15}$)-alkoxy; aryloxy; ($C_2$-$C_{15}$)-acyl; arylcarbonyl, ($C_2$-$C_{15}$)-acyloxy; arylcarbonyloxy; ($C_2$-$C_{15}$)-acylamino; ($C_1$-$C_{15}$)-alkylsulfonylamino; arylsulfonylamino; arylcarbonylamino; carbamoyl; N-monocyclo-($C_3$-$C_8$)-alkyl-carbamoyl; N-mono-($C_1$-$C_{15}$)-alkyl-carbamoyl; N,N-dicyclo-($C_3$-$C_8$)-alkyl-carbamoyl; N,N-di-($C_1$-$C_{15}$)-alkyl-carbamoyl; N-monoaryl-carbamoyl; N,N-diaryl-carbamoyl; N-monocyclo-($C_3$-$C_8$)-alkyl-N-monoarylcarbamoyl; N-mono-($C_1$-$C_{15}$)-alkyl-N-monoarylcarbamoyl; ($C_1$-$C_{15}$)-alkoxycarbonyl; aryloxycarbonyl; amino; monocyclo-($C_3$-$C_8$)-alkyl-amino; mono-($C_1$-$C_{15}$)-alkyl-amino; di(cyclo)-($C_3$-$C_8$)-alkyl-amino; di-($C_1$-$C_{15}$)-alkyl-amino; monoaryl-amino; diaryl-amino; monocyclo-($C_3$-$C_8$)-alkylmonoarylamino; mono-($C_1$-$C_{15}$)-alkylmonoaryl-amino; aminothiocarbonylamino; aminocarbonylamino; sulfamoyl; N-monocyclo-($C_3$-$C_8$)-alkyl-sulfamoyl; N-mono-($C_1$-$C_{15}$)-alkyl-sulfamoyl; N,N-dicyclo-($C_3$-$C_8$)-alkyl-sulfamoyl; N,N-di-($C_1$-$C_{15}$)-alkyl-sulfamoyl; N-monoaryl-sulfamoyl; N,N-diaryl-sulfamoyl; N-monocyclo-($C_3$-$C_8$)-alkyl-N-monoarylsulfamoyl; N-mono-($C_1$-$C_{15}$)-alkyl-N-monoarylsulfamoyl; aminosulfonylamino; ($C_1$-$C_{15}$)-alkylthio; arylthio; ($C_1$-$C_{15}$)-alkylsulfonyl or arylsulfonyl;

or each independently represent ($C_1$-$C_{15}$)-alkyl, N-mono-($C_1$-$C_{15}$)-alkylamino, N,N-di-($C_1$-$C_{15}$)-alkylamino, N—($C_1$-$C_{15}$)-alkyl-N-cyclo-($C_3$-$C_8$)-alkylamino, N—($C_1$-$C_{15}$)-alkyl-N-arylamino, ($C_1$-$C_{15}$)-alkoxy, ($C_1$-$C_{15}$)-alkylthio, ($C_2$-$C_{15}$)-acyl or ($C_1$-$C_{15}$)-alkylsulfonyl which are each substituted by one or more substituents selected from the group consisting of hydroxyl, ($C_3$-$C_8$)-cycloalkyl, heteroaryl, heterocyclo-($C_3$-$C_8$)-alkyl, aryl, aryloxy, ($C_1$-$C_{15}$)-alkoxy, ($C_1$-$C_{15}$)-alkylthio, arylthio, poly(oxy-($C_1$-$C_{15}$)-alkylene)s, halogen, cyano, ($C_1$-$C_{15}$)-alkoxycarbonyl, ($C_1$-$C_{15}$)-alkoxythiocarbonyl, ($C_2$-$C_{15}$)-acyloxy, carbamoyl, sulfamoyl, nitro, amino, ($C_2$-$C_{15}$)-acylamino, arylcarbonylamino, ($C_1$-$C_{15}$)-alkylsulfonylamino, arylsulfonylamino, aminocarbonylamino, aminothiocarbonylamino, N-mono-($C_1$-$C_{15}$)-alkylamino, N-mono-(hydroxy-($C_1$-$C_{15}$)-alkyl)amino, N,N-bis-(hydroxy-($C_1$-$C_{15}$)-alkyl)amino, N-mono-($C_1$-$C_{15}$)-alkoxy-($C_1$-$C_{15}$)-alkyl)amino, N,N-bis-($C_1$-$C_{15}$)-alkoxy-($C_1$-$C_{15}$)-alkyl)amino, N-mono-($C_1$-$C_{15}$)-alkoxy-($C_1$-$C_{15}$)-alkyl)amino, N-mono-($C_1$-$C_{15}$)-alkylthio-($C_1$-$C_{15}$)-alkyl)amino, N-bis-($C_1$-$C_{15}$)-alkylthio-($C_1$-$C_{15}$)-alkyl)amino, N-monocyclo-($C_3$-$C_8$)-alkylamino, N-monoaryl-amino, N,N-di-($C_1$-$C_{15}$)-alkyl-amino, N,N-dicyclo-($C_3$-$C_8$)-alkylamino, N,N-diaryl-amino, N—($C_1$-$C_{15}$)-alkyl-N-aryl-amino, N-cyclo-($C_3$-$C_8$)-alkyl-N-aryl-amino or aminosulfonylamino;

or each independently represent aryl, monoaryl-amino; diaryl-amino, aryloxy, arylthio, arylcarbonyl, arylcarbonyloxy; arylsulfonylamino; arylcarbonylamino, N-monoaryl-carbamoyl; N,N-diaryl-carbamoyl, N-monocyclo-($C_3$-$C_8$)-alkyl-N-monoarylcarbamoyl; N-mono-($C_1$-$C_{15}$)-alkyl-N-monoarylcarbamoyl; mono cyclo-($C_3$-$C_8$)-alkylmono arylamino; mono-($C_1$-$C_{15}$)-alkylmonoaryl-amino; N-monoaryl-sulfamoyl; N,N-diaryl-sulfamoyl; N-monocyclo-($C_3$-$C_8$)-alkyl-N- monoarylsulfamoyl; N-mono-($C_1$-$C_{15}$)-alkyl-N-monoarylsulfamoyl or arylsulfonyl, wherein the aryl radical is substituted by one or more substituents selected from the group consisting of hydroxyl, ($C_1$-$C_{15}$)-alkyl, ($C_3$-$C_8$)-cycloalkyl, heteroaryl, heterocyclo-($C_3$-$C_8$)-alkyl, ($C_1$-$C_{15}$)-alkoxy, ($C_1$-$C_{15}$)-alkylthio, poly(oxy-($C_1$-$C_{15}$)-alkylene)$_s$, halogen, cyano, ($C_1$-$C_{15}$)-alkoxycarbonyl, ($C_1$-$C_{15}$)-alkoxythiocarbonyl, ($C_2$-$C_{15}$)-acyloxy, carbamoyl, N-monocyclo-($C_3$-$C_8$)-alkyl-carbamoyl, N-mono-($C_1$-$C_{15}$)-alkyl-carbamoyl, N,N-dicyclo-($C_3$-$C_8$)-alkyl-carbamoyl, N,N-di-($C_1$-$C_{15}$)-alkyl-carbamoyl, N-monoaryl-carbamoyl, N,N-diaryl-carbamoyl, N-monocyclo-($C_3$-$C_8$)-alkyl-N-monoarylcarbamoyl, N-mono-($C_1$-$C_{15}$)-alkyl-N-monoarylcarbamoyl, sulfamoyl, N-monocyclo-($C_3$-$C_8$)-alkyl-sulfamoyl, N-mono-($C_1$-$C_{15}$)-alkyl-sulfamoyl, N-mono-(hydroxy-($C_1$-$C_{15}$)-alkyl)sulfamoyl, N,N-dicyclo-($C_3$-$C_8$)-alkyl-sulfamoyl, N,N-di-($C_1$-$C_{15}$)-alkyl-sulfamoyl, N-monoaryl-sulfamoyl, N,N-diaryl-sulfamoyl, N-monocyclo-($C_3$-$C_8$)-alkyl-N-monoarylsulfamoyl, N-mono-($C_1$-$C_{15}$)-alkyl-N-monoarylsulfamoyl, nitro, amino, ($C_2$-$C_{15}$)-acylamino, arylcarbonylamino, ($C_1$-$C_{15}$)-alkylsulfonylamino, arylsulfonylamino, aminocarbonylamino, aminothiocarbonylamino, N-mono-($C_1$-$C_{15}$)-alkylamino, N-mono-(hydroxy-($C_1$-$C_{15}$)-alkyl)amino, N,N-bis-(hydroxy-($C_1$-$C_{15}$)-alkyl)amino, N-mono(($C_1$-$C_{15}$)-alkoxy-($C_1$-$C_{15}$)-alkyl)amino, N,N-bis-(($C_1$-$C_{15}$)-alkoxy-($C_1$-$C_{15}$)-alkyl)amino, N-mono-(($C_1$-$C_{15}$)-alkoxy-($C_1$-$C_{15}$)-alkyl)amino, N-mono-(($C_1$-$C_{15}$)-alkylthio-($C_1$-$C_{15}$)-alkyl)amino, N-bis-(($C_1$-$C_{15}$)-alkylthio-($C_1$-$C_{15}$)-alkyl)amino, N-monocyclo-($C_3$-$C_8$)-alkylamino, N-monoaryl-amino, N,N-di-($C_1$-$C_{15}$)-alkyl-amino, N,N-dicyclo-($C_3$-$C_8$)-alkylamino, N,N-diaryl-amino, N—($C_1$-$C_{15}$)-alkyl-N-aryl-amino, N-cyclo-($C_3$-$C_8$)-alkyl-N-aryl-amino or aminosulfonylamino;

$R^{30}$ to $R^{33}$ each independently represent hydrogen, ($C_1$-$C_{15}$)-alkyl, singly or multiply oxygen-interrupted ($C_1$-$C_{15}$)-alkyl, aryl, aryl-($C_1$-$C_{15}$)-alkyl, ($C_1$-$C_{15}$)-alkylaryl, aryloxy, ($C_1$-$C_{15}$)-alkoxy, monohydroxy-($C_1$-$C_{15}$)-alkyl or polyhydroxy-($C_1$-$C_{15}$)-alkyl and have identical or different meanings within any one molecule of formula (I);

x represents a number from 1 to 30;

y, z and t each independently represent a number from 0 to 30;

A represents a group of formula (5)

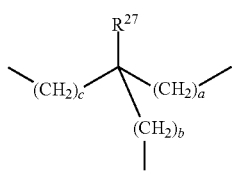

where a, b and c each independently represent a number from 0 to 15;

$R^{27}$ represents hydrogen, ($C_1$-$C_{15}$)-alkyl, singly or multiply oxygen-interrupted ($C_1$-$C_{15}$)-alkyl, aryloxy, ($C_1$-$C_{15}$)-alkoxy, monohydroxy-($C_1$-$C_{15}$)alkyl or polyhydroxy-($C_1$-$C_{15}$)-alkyl; and B represents a group of formula (6)

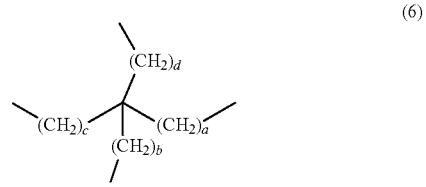

where a, b, c and d each independently represent a number from 0 to 15.

2. The compound as claimed in claim 1, wherein the compound of formula (1) is a compound of the formula (Ia):

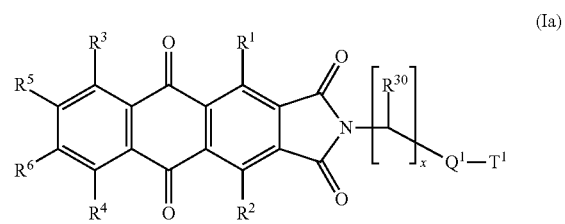

where $T^1$ represents, hydroxyl, amino, mono-($C_1$-$C_{15}$)alkylamino, bis-($C_1$-$C_{15}$)alkylamino, aryl, aryloxy, monohydroxy-($C_1$-$C_{15}$)-alkyl, polyhydroxy-($C_1$-$C_{15}$)-alkyl or ($C_1$-$C_{15}$)-alkyl-aryloxy;

$R^1$ to $R^6$ each independently represent hydrogen; ($C_1$-$C_{15}$)-alkyl; trifluoromethyl; aryl; halogen;

cyano; nitro; hydroxyl; ($C_1$-$C_{15}$)-alkoxy; aryloxy; arylcarbonyl, ($C_2$-$C_{15}$)-acylamino; ($C_1$-$C_{15}$)-alkylsulfonylamino; arylsulfonylamino; arylcarbonylamino; carbamoyl; amino; monocyclo-($C_3$-$C_8$)-alkyl-amino; mono-($C_1$-$C_{15}$)-alkyl-amino; di(cyclo)-($C_3$-$C_8$)-alkyl-amino; di-($C_1$-$C_{15}$)-alkyl-amino; monoaryl-amino; diaryl-amino; monocyclo-($C_3$-$C_8$)-alkylmonoarylamino; mono-($C_1$-$C_{15}$)-alkylmonoarylamino; aminocarbonylamino; sulfamoyl; aminosulfonylamino; ($C_1$-$C_{15}$)-alkylthio; arylthio or ($C_1$-$C_{15}$)-alkylsulfonyl;

or each independently represent ($C_1$-$C_{15}$)-alkyl, N-mono-($C_1$-$C_{15}$)-alkylamino, N-monocyclo-($C_3$-$C_8$)-alkylamino, N,N-di-($C_1$-$C_{15}$)-alkylamino, N,N-dicyclo-($C_3$-$C_8$)-alkylamino, N—($C_1$-$C_{15}$)-alkyl-N-cyclo-($C_3$-$C_8$)-alkylamino, N—($C_1$-$C_{15}$)-alkyl-N-arylamino, N-aryl-N-cyclo-($C_3$-$C_8$)-alkylamino, ($C_1$-$C_{15}$)-alkoxy, ($C_1$-$C_{15}$)-alkylthio or ($C_1$-$C_{15}$)-alkylsulfonyl which are each substituted by one or more substituents selected from the group consisting of hydroxyl, ($C_3$-$C_8$)-cycloalkyl, heteroaryl, heterocycloalkyl, aryl, aryloxy, ($C_1$-$C_{15}$)-alkoxy, halogen, cyano, ($C_1$-$C_{15}$)-alkoxycarbonyl, carbamoyl, sulfamoyl, nitro, amino, ($C_2$-$C_{15}$)-acylamino, arylcarbonylamino, ($C_1$-$C_{15}$)-alkylsulfonylamino, arylsulfonylamino, aminocarbonylamino and aminosulfonylamino;

or each independently represent aryl, monoaryl-amino; diaryl-amino, aryloxy, arylthio, arylcarbonyl, arylcarbonyloxy; arylsulfonylamino; arylcarbonylamino, monocyclo-($C_3$-$C_8$)-alkylmonoarylamino; mono-($C_1$-$C_{15}$)-alkylmonoaryl-amino or arylsulfonyl, wherein aryl is substituted by one or more substituents selected from the group consisting of hydroxyl, $(C_1-C_{15})$-alkyl, $(C_1-C_{15})$-alkoxy, $(C_1-C_{15})$-alkylthio, halogen, cyano, $(C_1-C_{15})$-alkoxycarbonyl, $(C_2-C_{1s})$— acyloxy, carbamoyl, N-mono-$(C_1-C_{15})$-alkyl-carbamoyl, N-mono-(hydroxy-$(C_1-C_{15})$-alkyl)carbamoyl, sulfamoyl, N-mono-$(C_1-C_{15})$-alkyl-sulfamoyl, N-mono-(hydroxy-$(C_1-C_{15})$-alkyl)sulfamoyl, nitro, amino, $(C_2-C_{15})$-acylamino, $(C_1-C_{15})$-alkylsulfonylamino, aminocarbonylamino, N-mono-$(C_1-C_{15})$-alkylamino, N-mono-(hydroxy-$(C_1-C_{15})$-alkyl)amino, N,N-bis-(hydroxy-$(C_1-C_{15})$-alkyl)amino, N,N-di-$(C_1-C_{15})$-alkylamino and aminosulfonylamino;

$R^{30}$ and $R^{31}$ each independently represent hydrogen or $(C_1-C_{15})$-alkyl; singly or multiply oxygen-interrupted $(C_1-C_{15})$alkyl, aryl, aryl-$(C_1-C_{15})$-alkyl, $(C_1-C_{15})$-alkyl-aryl, aryloxy, $(C_1-C_{15})$-alkoxy, monohydroxy-$(C_1-C_{15})$-alkyl or polyhydroxy-$(C_1-C_{15})$-alkyl;

x represents a number from 1 to 10; and $Q^1$ is a group of formula (4)

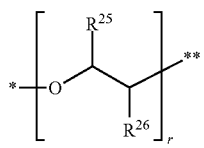

(4)

where r represents a rational number from 0.1 to 200 and has identical or different meanings within any one molecule of formula (I);

$R^{25}$ and $R^{26}$ each dependently represent hydrogen, $(C_1-C_{15})$-alkyl, singly or multiply oxygen-interrupted $(C_1-C_{15})$-alkyl, aryl, aryloxy, $(C_1-C_{15})$-alkoxy, monohydroxy-$(C_1-C_{15})$-alkyl or polyhydroxy-$(C_1-C_{15})$alkyl;

and where $R^{25}$ and $R^{26}$ have identical or different meanings within any one molecule of formula (I); and where when $R^{25}$ and $R^{26}$ have different meanings within any one molecule of formula (I) these different meanings are randomly distributed or regions of respectively identical meanings follow each other; and wherein the groups T, A and B are bonded to the bond * or to the bond **.

3. The compound as claimed in claim 1, wherein the compound of formula (1) is a compound of the formula (Ib):

clo-$(C_3-C_8)$-alkylmonoarylamino; mono-$(C_1-C_{15})$-alkylmonoarylamino; aminocarbonylamino; sulfamoyl; aminosulfonylamino; $(C_1-C_{15})$-alkylthio; arylthio or $(C_1-C_{15})$-alkylsulfonyl;

or each independently represent $(C_1-C_{15})$-alkyl, N-mono-$(C_1-C_{15})$-alkylamino, N-monocyclo-$(C_3-C_8)$-alkylamino, N,N-di-$(C_1-C_{15})$-alkylamino, N,N-dicyclo-$(C_3-C_8)$-alkylamino, N—$(C_1-C_{15})$-alkyl-N-cyclo-$(C_3-C_8)$-alkylamino, N—$(C_1-C_{15})$-alkyl-N-arylamino, N-aryl-N-cyclo-$(C_3-C_8)$-alkylamino, $(C_1-C_{15})$-alkoxy, $(C_1-C_{15})$-alkylthio or $(C_1-C_{15})$-alkylsulfonyl which are each substituted by one or more substituents selected from the group consisting of hydroxyl, heteroaryl, heterocycloalkyl, aryl, aryloxy, $(C_1-C_{15})$-alkoxy, halogen, cyano, $(C_1-C_{15})$-alkoxycarbonyl, carbamoyl, sulfamoyl, nitro, amino, $(C_2-C_{15})$-acylamino, arylcarbonylamino, $(C_1-C_{15})$-alkylsulfonylamino, arylsulfonylamino, aminocarbonylamino and aminosulfonylamino;

or each independently represent aryl, monoaryl-amino; diaryl-amino, aryloxy, arylthio, arylcarbonyl, arylcarbonyloxy; arylsulfonylamino; arylcarbonylamino, monocyclo-$(C_3-C_s)$-alkylmonoarylamino; mono-$(C_1-C_{15})$-alkylmonoaryl-amino or arylsulfonyl, wherein aryl is substituted by one or more substituents selected from the group consisting of hydroxyl, (C alkyl, $(C_1-C_{15})$-alkoxy, $(C_1-C_{15})$-alkylthio, halogen, cyano, $(C_1-C_{15})$-alkoxycarbonyl, $(C_2-C_{10})$-acyloxy, carbamoyl, N-mono-$(C_1-C_{15})$-alkyl-carbamoyl, N-mono-(hydroxy-$(C_1-C_{15})$-alkyl)carbamoyl, sulfamoyl, N-mono-$(C_1-C_{15})$-alkyl-sulfamoyl, N-mono-(hydroxy-$(C_1-C_{15})$-alkyl)sulfamoyl, nitro, amino, $(C_2-C_{15})$-acylamino, $(C_1-C_{15})$-alkylsulfonylamino, aminocarbonylamino, N-mono-$(C_1-C_{15})$-alkylamino, N-mono-(hydroxy-$(C_1-C_{15})$-alkyl)amino, N,N-bis-(hydroxy-$(C_1-C_{15})$-alkyl)amino, N,N-di-$(C_1-C_{15})$-alkylamino and aminosulfonylamino;

$R^{30}$ and $R^{31}$ each independently represent hydrogen, $(C_1-C_{15})$-alkyl; singly or multiply oxygen-interrupted $(C_1-C_{15})$alkyl, aryl, aryl-$(C_1-C_{15})$-alkyl, $(C_1-C_{15})$-alkyl-aryl, aryloxy, $(C_1-C_{15})$-alkoxy, monohydroxy-$(C_1-C_{15})$-alkyl or polyhydroxy-$(C_1-C_{15})$-alkyl;

x represents a number from 1 to 10; and y represents a number from 0 to 10; and (Ib)

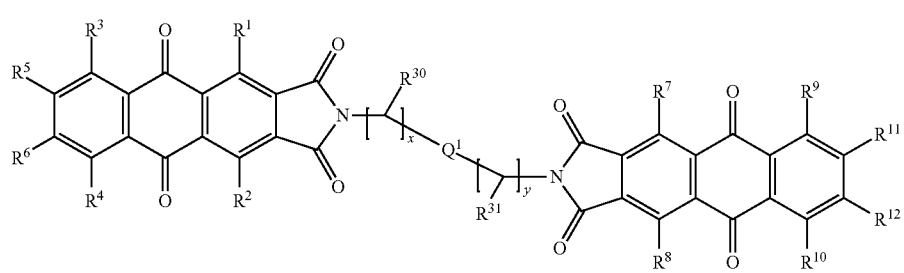

where $R^1$ to $R^{12}$ each dependently represent hydrogen; $(C_1-C_{15})$-alkyl; trifluoromethyl; aryl; halogen; cyano; nitro; hydroxyl; $(C_1-C_5)$-alkoxy; aryloxy; arylcarbonyl, $(C_2-C_{15})$-acylamino; $(C_1-C_{15})$-alkylsulfonylamino; arylsulfonylamino; arylcarbonylamino; carbamoyl; amino; monocyclo-$(C_3-C_8)$-alkyl-amino; mono-$(C_1-C_5)$-alkyl-amino; di(cyclo)-$(C_3-C_8)$-alkyl-amino; di-$(C_1-C_{15})$-alkyl-amino; monoaryl-amino; diaryl-amino; monocy- $Q^1$ is a group of formula (4)

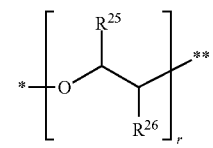

(4)

where
r represents a rational number from 0.1 to 200 and has identical or different meanings within any one molecule of formula (I);

$R^{25}$ and $R^{26}$ each dependently represent hydrogen, $(C_1$-$C_{15})$-alkyl, singly or multiply oxygen-interrupted $(C_1$-$C_{15})$-alkyl, aryl, aryloxy, $(C_1$-$C_{15})$-alkoxy, monohydroxy-$(C_1$-$C_{15})$-alkyl or polyhydroxy-$(C_1$-$C_{15})$alkyl;

and where $R^{25}$ and $R^{26}$ have identical or different meanings within any one molecule of formula (I); and where when $R^{25}$ and $R^{26}$ have different meanings within any one molecule of formula (I) these different meanings are randomly distributed or regions of respectively identical meanings follow each other; and wherein the groups T, A and B are bonded to the bond * or to the bond **.

4. The compound as claimed in claim 1, wherein the compound of formula (1) is a compound of the formula (Ic)

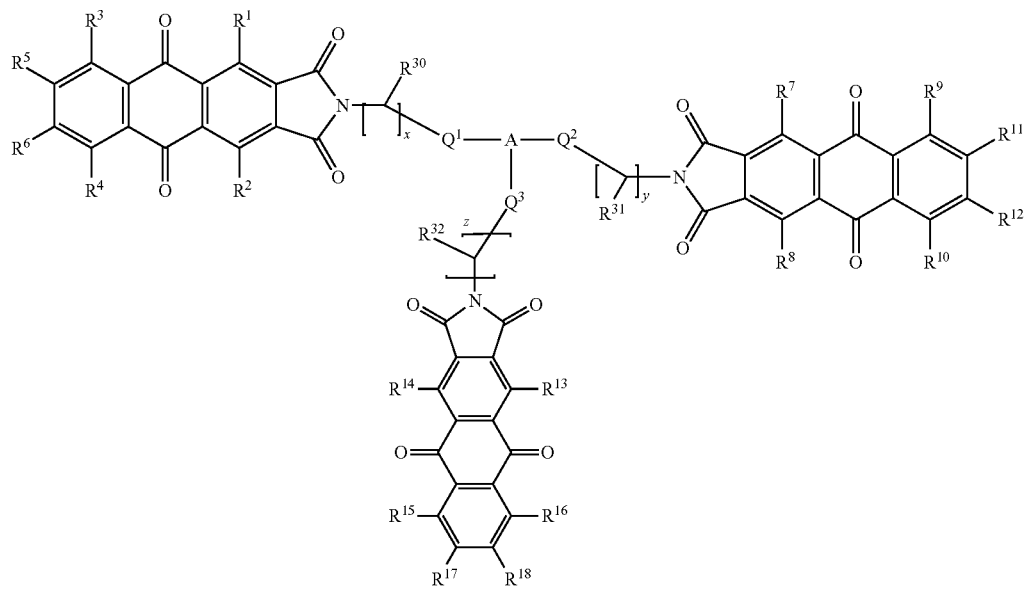

(Ic)

where
$R^1$ to $R^{18}$ each independently represent hydrogen, $(C_1$-$C_5)$-alkyl; trifluoromethyl; aryl; halogen; cyano; nitro; hydroxyl; $(C_1$-$C_{15})$-alkoxy; aryloxy; arylcarbonyl, $(C_2$-$C_{15})$-acylamino; $(C_1$-$C_{15})$-alkylsulfonylamino; arylsulfonylamino; arylcarbonylamino; carbamoyl; amino; monocyclo-$(C_3$-$C_8)$-alkyl-amino; mono-$(C_1$-$C_{15})$-alkyl-amino; di(cyclo)-$(C_3$-$C_8)$-alkyl-amino; di-$(C_1$-$C_{15})$-alkyl-amino; monoaryl-amino; diaryl-amino; monocyclo-$(C_3$-$C_8)$-alkylmonoarylamino; mono-$(C_1$-$C_{15})$-alkylmonoarylamino; aminocarbonylamino; sulfamoyl; aminosulfonylamino; $(C_1$-$C_{15})$-alkylthio; arylthio or $(C_1$-$C_4)$-alkylsulfonyl;

or each independently represent $(C_1$-$C_{15})$-alkyl, N-mono-$(C_1$-$C_{15})$-alkylamino, N-monocyclo-$(C_3$-$C_8)$-alkylamino, N,N-di-$(C_1$-$C_{15})$-alkylamino, N,N-dicyclo-$(C_3$-$C_8)$-alkylamino, N—$(C_1$-$C_{15})$-alkyl-N-cyclo-$(C_3$-$C_8)$-alkylamino, N—$(C_1$-$C_{15})$-alkyl-N-arylamino, N-aryl-N-cyclo-$(C_3$-$C_8)$-alkylamino, $(C_1$-$C_{15})$-alkoxy, $(C_1$-$C_{15})$-alkylthio or $(C_1$-$C_{15})$-alkylsulfonyl which are each substituted by one or more substituents selected from the group consisting of hydroxyl, heteroaryl, heterocycloalkyl, aryl, aryloxy, $(C_1$-$C_{15})$-alkoxy, halogen, cyano, $(C_1$-$C_{15})$-alkoxycarbonyl, carbamoyl, sulfamoyl, nitro, amino, $(C_2$-$C_{15})$-acylamino, arylcarbonylamino, $(C_1$-$C_{15})$-alkylsulfonylamino, arylsulfonylamino, aminocarbonylamino and aminosulfonylamino;

or each independently represent aryl, monoaryl-amino; diaryl-amino, aryloxy, arylthio, arylcarbonyl, arylcarbonyloxy; arylsulfonylamino; arylcarbonylamino, monocyclo-$(C_3$-$C_8)$-alkylmonoarylamino; mono-$(C_1$-$C_{15})$-alkylmonoaryl-amino or arylsulfonyl, wherein aryl is substituted by one or more substituents selected from the group consisting of hydroxyl, $(C_1$-$C_{15})$-alkyl, $(C_1$-$C_{15})$-alkoxy, $(C_1$-$C_{15})$-alkylthio, halogen, cyano, $(C_1$-$C_{15})$-alkoxycarbonyl, $(C_2$-$C_{15})$-acyloxy, carbamoyl, N-mono-$(C_1$-$C_{15})$-alkyl-carbamoyl, N-mono-(hydroxy-$(C_1$-$C_{15})$-alkyl)carbamoyl, sulfamoyl, N-mono-$(C_1$-$C_{15})$-alkyl-sulfamoyl, N-mono-(hydroxy-$(C_1$-$C_{15})$-alkyl)sulfamoyl, nitro, amino, $(C_2$-$C_{15})$-acylamino, $(C_1$-$C_{15})$-alkylsulfonylamino, aminocarbonylamino, N-mono-$(C_1$-$C_{15})$-alkylamino, N-mono-(hydroxy-$(C_1$-$C_{15})$-alkyl)amino, N,N-bis-(hydroxy-$(C_1$-$C_{15})$-alkyl)amino, N,N-di-$(C_1$-$C_{15})$-alkyl-amino and aminosulfonylamino;

$R^{30}$ to $R^{32}$ each independently represent hydrogen, $(C_1$-$C_{15})$-alkyl; singly or multiply oxygen-interrupted $(C_1$-$C_{15})$-alkyl, aryl, aryl-$(C_1$-$C_{15})$-alkyl, $(C_1$-$C_{15})$-alkylaryl, aryloxy, $(C_1$-$C_{15})$-alkoxy, monohydroxy-$(C_1$-$C_{15})$-alkyl or polyhydroxy-$(C_1$-$C_{15})$-alkyl;

x represents a number from 1 to 10;

y represents a number from 0 to 10; and z represents a number from 0 to 10; and $Q^1$, $Q^2$, $Q^3$ and A are each as defined in claim 1.

5. The compound as claimed in claim 1, wherein the compound of formula (1) is a compound of the formula (Id)

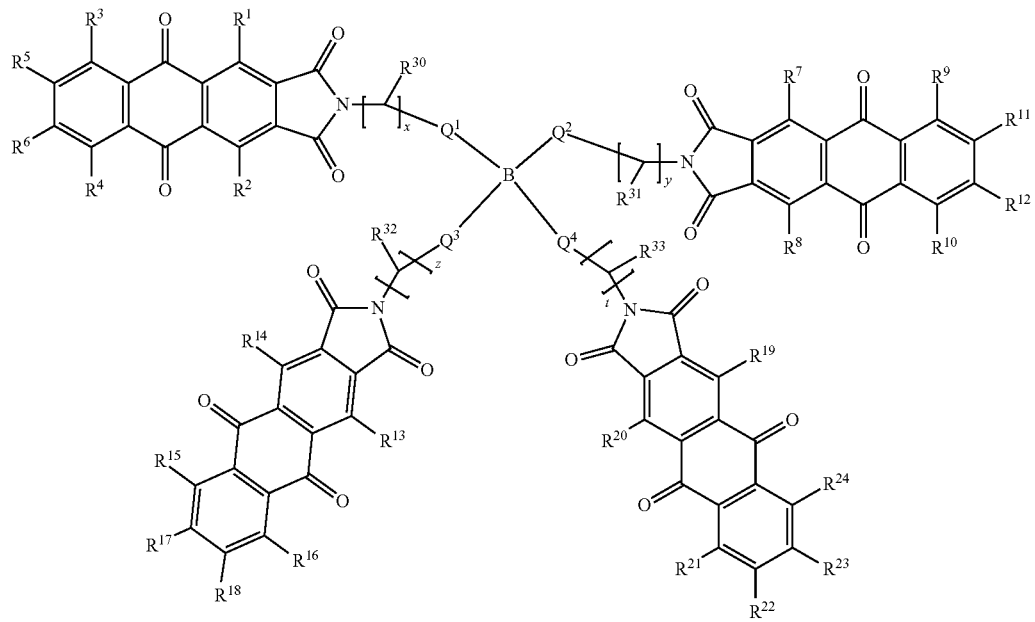

where
R$^1$ to R$^{24}$ each independently represent hydrogen; (C$_1$-C$_5$)-alkyl; trifluoromethyl; aryl; halogen; cyano; nitro; hydroxyl; (C$_1$-C$_{15}$)-alkoxy; aryloxy; arylcarbonyl, (C$_2$-C$_{15}$)-acylamino; (C$_1$-C$_{15}$)-alkylsulfonylamino; arylsulfonylamino; arylcarbonylamino; carbamoyl; amino; monocyclo-(C$_3$-C$_8$)-alkyl-amino; mono-(C$_1$-C$_{15}$)-alkyl-amino; di(cyclo)-(C$_3$-C$_8$)-alkyl-amino; di-(C$_1$-C$_{15}$)-alkyl-amino; monoaryl-amino; diaryl-amino; monocyclo-(C$_3$-C$_8$)-alkylmonoarylamino; mono-(C$_1$-C$_{15}$)-alkylmonoarylamino; aminocarbonylamino; sulfamoyl; aminosulfonylamino; (C$_1$-C$_{15}$)-alkylthio; arylthio or (C$_1$-C$_4$)-alkylsulfonyl;
or each independently represent (C$_1$-C$_{15}$)-alkyl, N-mono-(C$_1$-C$_{15}$)-alkylamino, N-monocyclo-(C$_3$-C$_8$)-alkylamino, N,N-di-(C$_1$-C$_{15}$)-alkylamino, N,N-dicyclo-(C$_3$-C$_8$)-alkylamino, N—(C$_1$-C$_{15}$)-alkyl-N-cyclo-(C$_3$-C$_8$)-alkylamino, N—(C$_1$-C$_{15}$)-alkyl-N-arylamino, N-aryl-N-cyclo-(C$_3$-C$_8$)-alkylamino, (C$_1$-C$_{15}$)-alkoxy, (C$_1$-C$_{15}$)-alkylthio or (C$_1$-C$_{15}$)-alkylsulfonyl which are each substituted by one or more substituents selected from the group consisting of hydroxyl, heteroaryl, heterocycloalkyl, aryl, aryloxy, (C$_1$-C$_{15}$)-alkoxy, halogen, cyano, (C$_1$-C$_{15}$)-alkoxycarbonyl, carbamoyl, sulfamoyl, nitro, amino, (C$_2$-C$_{15}$)-acylamino, arylcarbonylamino, (C$_1$-C$_{15}$)-alkylsulfonylamino, arylsulfonylamino, aminocarbonylamino and aminosulfonylamino;
or each independently represent aryl, monoaryl-amino; diaryl-amino, aryloxy, arylthio, arylcarbonyl, arylcarbonyloxy; arylsulfonylamino; arylcarbonylamino, monocyclo-(C$_3$-C$_8$)-alkylmonoarylamino; mono-(C$_1$-C$_{15}$)-alkylmonoaryl-amino or arylsulfonyl, wherein aryl is substituted by one or more substituents selected from the group consisting of hydroxyl, (C$_1$-C$_{15}$)-alkyl, (C$_1$-C$_{15}$)-alkoxy, (C$_1$-C$_{15}$)-alkylthio, halogen, cyano, (C$_1$-C$_{15}$)-alkoxycarbonyl, (C$_2$-C$_{15}$)-acyloxy, carbamoyl, N-mono-(C$_1$-C$_{15}$)-alkyl-carbamoyl, N-mono-(hydroxy-(C$_1$-C$_{15}$)-alkyl)carbamoyl, sulfamoyl, N-mono-(C$_1$-C$_{15}$)-alkyl-sulfamoyl, N-mono-(hydroxy-(C$_1$-C$_{15}$)-alkyl)sulfamoyl, nitro, amino, (C$_2$-C$_{15}$)-acylamino, (C$_1$-C$_{15}$)-alkylsulfonylamino, aminocarbonylamino, N-mono-(C$_1$-C$_{15}$)-alkylamino, N-mono-(hydroxy-(C$_1$-C$_{15}$)-alkyl)amino, N,N-bis-(hydroxy-(C$_1$-C$_{15}$)-alkyl)amino, N,N-di-(C$_1$-C$_{15}$)-alkylamino and aminosulfonylamino;
R$^{30}$ to R$^{33}$ each independently represent hydrogen, (C$_1$-C$_{15}$)-alkyl; singly or multiply oxygen-interrupted (C$_1$-C$_{15}$)alkyl, aryl, aryl-(C$_1$-C$_{15}$)-alkyl, (C$_1$-C$_{15}$)-alkylaryl, aryloxy, (C$_1$-C$_{15}$)-alkoxy, monohydroxy-(C$_1$-C$_{15}$)-alkyl or polyhydroxy-(C$_1$-C$_{15}$)-alkyl;
x represents a number from 1 to 10;
y represents a number from 0 to 10;
z represents a number from 0 to 10; and
t represents a number from 0 bis 10; and
Q$^1$, Q$^2$, Q$^3$, Q$^4$ and B are each as defined in claim 1.

6. A process for preparing the compound of formula (I) as claimed in claim 1, which comprises reacting a compound of formula (II)

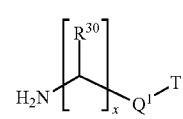

where R$^{30}$, Q$^1$, T and x are each as defined in claim 9, with a compound of formula (III)

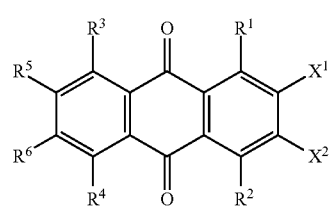

where
$R^1$ to $R^6$ are each as defined in claim 1 and
$X^1$ and $X^2$ each represent —COOH or —CN or together represent —CO—O—OC— or —CO—NH—OC—.

7. A process for coloring a polymer which comprises utilizing the compound as claimed in claim 1.

8. A masterbatch comprising the compound as claimed in claim 1 and a carrier material.

9. The compound as claimed in claim 1, wherein T represents the group of formula (3).

10. The compound as claimed in claim 1, wherein T represents the group of formula (4).

11. A process for coloring a polymer which comprises utilizing the compound as claimed in claim 9.

12. A masterbatch comprising the compound as claimed in claim 9 and a carrier material.

\* \* \* \* \*